(12) United States Patent
Thomas et al.

(10) Patent No.: US 7,714,570 B2
(45) Date of Patent: May 11, 2010

(54) METHODS AND APPARATUS FOR AN ANALOG ROTATIONAL SENSOR HAVING MAGNETIC SENSOR ELEMENTS

(75) Inventors: Monica J. Thomas, Manchester, NH (US); Michael C. Doogue, Manchester, NH (US); Hooman Bustani, Manchester, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 234 days.

(21) Appl. No.: 11/425,567

(22) Filed: Jun. 21, 2006

(65) Prior Publication Data
US 2007/0296411 A1    Dec. 27, 2007

(51) Int. Cl.
*G01B 7/30* (2006.01)
(52) U.S. Cl. .............................. 324/207.2; 324/207.25; 324/174
(58) Field of Classification Search . 324/207.2–207.25, 324/173–174
See application file for complete search history.

(56) References Cited

U.S. PATENT DOCUMENTS

| | | | | |
|---|---|---|---|---|
| 4,401,944 | A | * | 8/1983 | Narimatsu et al. ..... 324/207.21 |
| 4,926,121 | A | * | 5/1990 | Guay ...................... 324/207.2 |
| 4,951,300 | A | * | 8/1990 | Koike .......................... 377/17 |
| 5,004,981 | A | * | 4/1991 | Hashimoto et al. ..... 324/207.22 |
| 5,444,369 | A | | 8/1995 | Luetzow |
| 5,650,721 | A | | 7/1997 | van den Berg et al. |
| 5,880,586 | A | | 3/1999 | Dukart et al. |
| 6,166,535 | A | | 12/2000 | Irle et al. |
| 6,236,199 | B1 | | 5/2001 | Irle et al. |
| 6,288,533 | B1 | | 9/2001 | Haeberli et al. |
| 6,291,907 | B1 | * | 9/2001 | Haigh et al. ................... 307/91 |
| 6,545,462 | B2 | | 4/2003 | Schott et al. |
| 6,573,710 | B1 | | 6/2003 | Santos et al. |
| 6,580,269 | B2 | | 6/2003 | Hiligsmann et al. |
| 6,724,184 | B1 | | 4/2004 | Marx et al. |
| 6,762,897 | B1 | | 7/2004 | Kabashima et al. |
| 6,806,702 | B2 | | 10/2004 | Lamb et al. |
| 6,969,988 | B2 | | 11/2005 | Kakuta et al. |

(Continued)

FOREIGN PATENT DOCUMENTS

DE    37 26 260 A1    2/1989

(Continued)

OTHER PUBLICATIONS

Austriamicrosystems, 12 Bit Programmable Magnetic Rotary Encoder Data Sheet, Oct. 3, 2006, pp. 1-23, austriamicrosystems AG, Schloss Premstatten, Austria.

(Continued)

*Primary Examiner*—Jay M Patidar
(74) *Attorney, Agent, or Firm*—Daly, Crowley, Mofford & Durkee, LLP

(57) ABSTRACT

Methods and apparatus for a sensor include a signal generation module including a first magnetic sensor to generate a first waveform in the form of a sine wave and a second magnetic sensor to generate a second waveform in the form of a cosine wave, the first and second waveforms containing angular position information of a magnet in relation to the first and second magnetic sensors, and an analog signal processing module for providing an algebraic manipulation of the first waveform and the second waveform to generate a linear position output voltage signal.

26 Claims, 29 Drawing Sheets

U.S. PATENT DOCUMENTS

| | | | |
|---|---|---|---|
| 7,119,538 | B2 | 10/2006 | Blossfeld |
| 2002/0021124 | A1 | 2/2002 | Schott et al. |
| 2002/0167306 | A1 | 11/2002 | Zalunardo et al. |
| 2005/0127899 | A1* | 6/2005 | Kakuta et al. ............ 324/207.2 |
| 2005/0275399 | A1* | 12/2005 | Kitanaka et al. ....... 324/207.12 |
| 2006/0208727 | A1* | 9/2006 | Matsumoto et al. .... 324/207.25 |
| 2007/0029998 | A1 | 2/2007 | Popovic et al. |
| 2007/0296411 | A1 | 12/2007 | Thomas et al. |

FOREIGN PATENT DOCUMENTS

| | | | |
|---|---|---|---|
| DE | 40 18 839 | A1 | 12/1991 |
| DE | 195 48 385 | A1 | 7/1997 |
| DE | 199 20 596 | A1 | 11/2000 |
| DE | 100 41 089 | A1 | 3/2002 |
| DE | 10116240 | A1 | 10/2002 |
| EP | 0 368 687 | A | 5/1990 |
| EP | 0 916 074 | B1 | 7/2003 |
| EP | 1 882 907 | A1 | 1/2008 |
| EP | 2 000 813 | A1 | 12/2008 |
| EP | 2 000 814 | A2 | 12/2008 |
| WO | WO 00/02266 | | 1/2000 |
| WO | WO 2004/113928 | A | 12/2004 |

OTHER PUBLICATIONS

Austriamicrosystems, 10 Bit 360 Programmable Magnetic Rotary Encoder Data Sheet, Oct. 25, 2005, pp. 1-28, austriamicrosystems AG, Schloss Premstatten, Austria.

Austriamicrosystems, Programmable 360 Magnetic Angle Encoder With Absolute SSI and Analog Outputs Preliminary Data Sheet, Oct. 3, 2006, pp. 1-26, austriamicrosystems AG, Schloss Premstatten, Austria.

Austriamicrosystems, Programmable 64 PPR Incremental Magnetic Rotary Encoder Data Sheet, Oct. 3, 2006, pp. 1-17, austriamicrosystems AG, Schloss Premstatten, Austria.

Austriamicrosystems, 12 Bit Programmable Magnetic Rotary Encoder Fact Sheet, Oct. 11, 2005, p. 1-1, austriamicrosystems AG, Schloss Premstatten, Austria.

Austriamicrosystems, 10 Bit Programmable 360 Magnetic Angle Encoder With Absolute Digital and Analog Outputs Fact Sheet, Apr. 11, 2005, p. 1-1, austriamicrosystems AG, Schloss Premstatten, Austria.

Austriamicrosystems, 8 Bit (64 PPR) Incremental Magnetic Rotary Encoder Fact Sheet, Oct. 24, 2005, p. 1-1, austriamicrosystems AG, Schloss Premstatten, Austria.

IC Haus, Angular Hall Sensor / Encoder, 2005, pp. 1-17, iC-Haus GmbH, D-55294 Bodenhelm, Germany.

Melexis Microelectronic Integrated Systems, Rotary Position Sensor IC, Sep. 20, 2005, pp. 1-34, Melexis Microelectronic Integrated Systems.

Haberli et al., "Two-Dimensional Magnetic Microsensor With On-Chip Signal Processing for Countactless Angle Measurement", IEEE Journal of Solid-State Circuits, vol. 31, No. 12, Dec. 1996, pp. 1902-1907.

Haberli et al., "Contactless Angle Measurement by CMOS Magnetic Sensor With On-Chip Read-Out Circuit" in Proc. Transducers'95, 1995, vol. 2, pp. 134-137, Jun. 25-29, 1995.

Notification of Transmittal of the International Search Report and the Written Opinion of the International Searching Authroity, or the Declaration, Jan. 2008.

P. Kejik, S. Reymond, R.S. Popovic, Circular Hall Transducer for Angular Position Sensing, 2007, IEEE, pp. 2593-2596.

PCT International Search Report for PCT/US2008/088128 and Written Opinion of the International Searching Authority mailing date Jul. 3, 2009.

Lou Law, Angular Position Sensing with 2-Axis Hall ICs, Sensors, Mar. 2003, pp. 35-43.

Austriamicrosystems, 10 Bit Programmable Magnetic Rotary Encoder, AS5040 Data Sheet, Copyright 2004, pp. 1-20.

* cited by examiner

METHODS AND APPARATUS FOR AN ANALOG ROTATIONAL SENSOR HAVING MAGNETIC SENSOR ELEMENTS

CROSS-REFERENCE TO RELATED APPLICATIONS

Not applicable.

STATEMENT REGARDING FEDERALLY SPONSORED RESEARCH

Not Applicable.

BACKGROUND

As is known in the art, there are a variety of rotational sensors for determining angular position. In one type of sensor, Hall effect modules are used to generate sine and cosine signals from which angular position can be determined. Such sensors use digital processing to process the sine and cosine signals generated from the Hall cells. Due to analog to digital signal conversion and other factors, such digital processing imposes limitations on the speed and accuracy of angular position determination.

For example, part number AS5043 from Austria Microsystems is an angular position sensor that digitally processes information from a Hall array using a coordinate rotational digital computer (CORDIC) that implements an iterative calculation for complex math with a lookup table. Other sensors use similar digital processing to implement various processing algorithms for computing position information.

SUMMARY

The present invention provides a rotational sensor that generates a linear output from phase-shifted waveforms generated by magnetic sensors using analog signal processing. In one embodiment, the sensor is provided on a single substrate. With this arrangement, an efficient and cost effective sensor is provided. While the invention is shown and described in exemplary embodiments as having particular circuit and signal processing implementations, it is understood that the invention is applicable to a variety of analog processing techniques, implementations, and algorithms that are within the scope of the invention.

In one aspect of the invention, a sensor includes a signal generation module including a magnetic sensor to provide position information for generating first and second waveforms corresponding to the position information. An optional signal inversion module can be coupled to the signal generation module for inverting the first waveform to provide a first inverted waveform and for inverting the second waveform to provide a second inverted waveform. An analog signal processing module can be coupled to the optional signal inversion module for providing an algebraic manipulation of a subset of the first waveform, the second waveform, the first inverted waveform, and the second inverted waveform, from the signal inversion module and generating a linear position output voltage signal.

Embodiments of the sensor can include various features. For example, the signal inversion module can output the first and second waveforms in a first region and output the first and second inverted waveforms in a second region, wherein the second region corresponds to a position range in which output would be non-linear without inversion of the first and second waveforms. A region indicator bit can indicate position range in the first or second region. The first region can span about one hundred and eighty degrees. The first region can correspond to $-\sin(\theta) > \cos(\theta)$ where $-\sin(\theta)$ refers to the inversion of the sine wave about an offset voltage, $\sin(\theta)$ and $\cos(\theta)$ embody the amplitudes and offsets associated with the sinusoids, and $\theta$ indicates an angle of a rotating magnet in the magnetic sensor. The first region can correspond to a range for $\theta$ of about 315 degrees to about 135 degrees. The output in the first region can defined by $$\text{output} = \frac{A\sin(\theta) + \text{offset}}{\frac{1}{k}(A\sin(\theta) + A\cos(\theta) + 2\text{offset})}$$

where $\theta$ indicates an angle of a rotating magnet in the magnetic sensor, offset is a vertical offset of the first and second waveforms with respect to ground, A is an amplitude of the first and second waveforms, and k is a real number affecting gain and vertical offset of the output. The signal processing module can include an analog multiplier. The sensor can be provided on a single substrate. The sensor can include a magnet having a plurality of pole-pairs to increase waveform frequency for reducing maximum angular error.

In another aspect of the invention, a sensor includes a magnetic position sensing element to generate angular position information, a first signal generator to generate a first waveform corresponding to the angular position information, a second signal generator to generate a second waveform corresponding to the angular position information, wherein the first and second waveforms are offset by a predetermined amount. The sensor can further include a first inverter to invert the first waveform for providing a first inverted waveform and a second inverter to invert the second waveform for providing a second inverted waveform, wherein the first and second waveforms are inverted about an offset voltage, and an analog signal processing module to generate a linear output signal from the first waveform, the second waveform, the first inverted waveform, and the second inverted waveform.

The sensor can include one or more of various features. The first and second waveforms can be used by the signal processing module in a first region and the first inverted waveform and the second inverted waveform being used in second region to generate the linear output signal. The first region can correspond to about 180 degrees of angular position for the position sensing element. A region indicator can indicate a first or second region of operation.

In a further aspect of the invention, a sensor includes a signal generator means including a position sensor, a signal inversion means coupled to the signal generator means, and an analog signal processing means coupled to the signal inversion means to generate an output signal corresponding to angular position of the position sensor. In one embodiment, the sensor is provided on a single substrate.

In another aspect of the invention, a method includes providing a signal generator module including a magnetic position sensing element, coupling a signal inversion module to the signal generator module, and coupling an analog signal processing module to the signal inversion module to generate a linear output signal corresponding to information from the position sensing element.

The method can include one or more of providing the signal generator module, the signal inversion module, and the signal processing module on a single substrate, and generating first and second waveforms corresponding to the information from the position sensing element and inverting the first and second waveforms to generate the linear output signal.

BRIEF DESCRIPTION OF THE DRAWINGS

The foregoing features of this invention, as well as the invention itself, may be more fully understood from the following description of the drawings in which.

DETAILED DESCRIPTION

Figure 1:
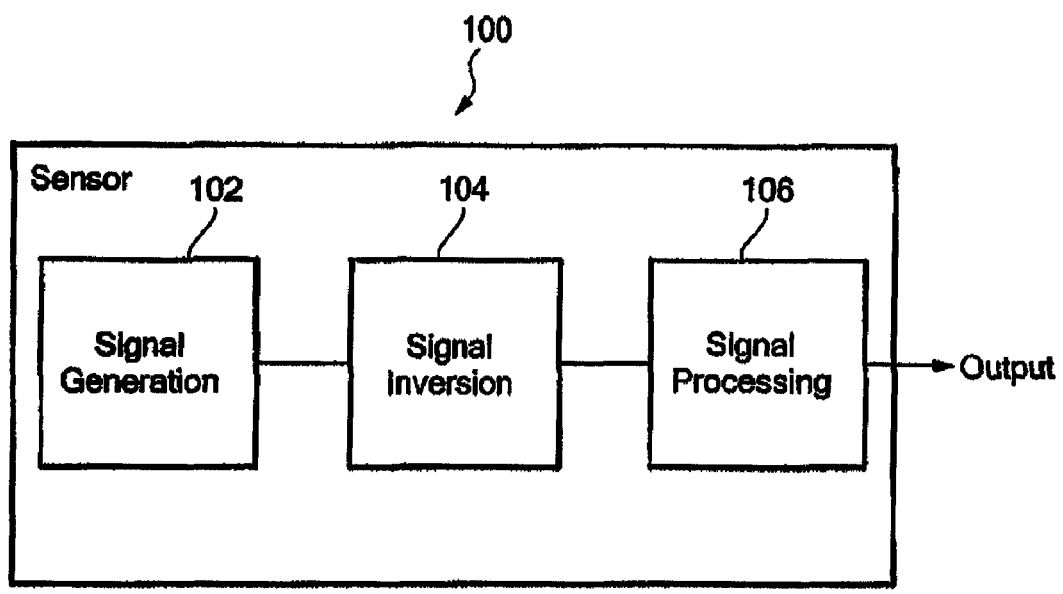
FIG. 1 is a block diagram of an exemplary analog angle sensor in accordance with the present invention.

FIG. 1 shows an analog position sensor 100 having a signal generation module 102 to generate waveforms from magnetic sensors that are provided to an optional signal inversion module 104, which generates inverted versions of the waveforms. A signal processing module 106 implements an analog algebraic manipulation of the waveforms. The signal manipulation module 106 generates a linear output voltage that is proportional to angular position. In one embodiment, the sensor is provided on a single silicon substrate.

Figure 1A:
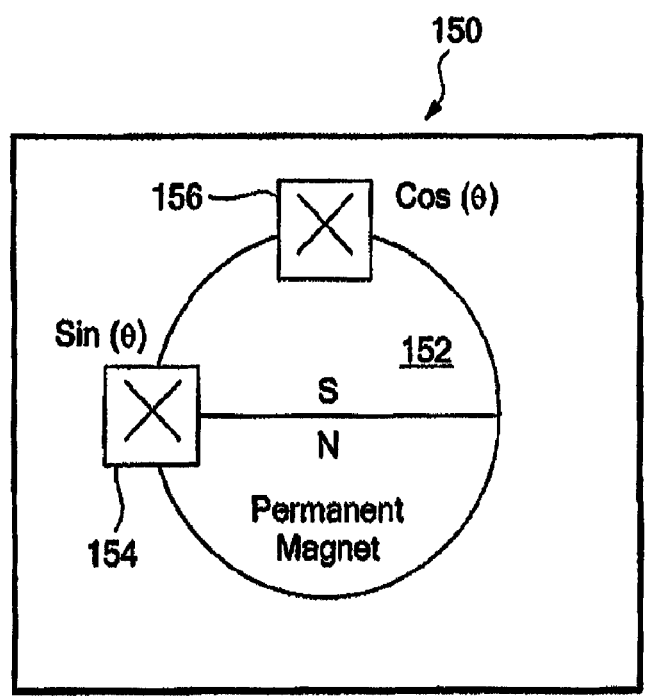
FIG. 1A is a pictorial representation of a Hall element that can form a part of a sensor in accordance with the present invention.

FIG. 1A shows a magnetic sensor shown as an exemplary Hall effect device 150 having a permanent magnet 152 with a first magnetic sensor 154 to generate a sine wave and a second magnetic sensor 156 placed ninety degrees from the first sensor to generate a cosine wave. The angular position θ of the rotating magnet 152 can be determined from the sine and cosine signals to provide a linear sensor output. In an exemplary embodiment, the sensor circuit has a 360° sensing range and operates on a single power supply.

In one embodiment, the sensor output is generated from the relationship set forth in Equation 1 below:

$$\text{output} = \frac{A\sin(\theta) + \text{offset}}{\frac{1}{k}(A\sin(\theta) + A\cos(\theta) + 2\text{offset})} \qquad \text{Eq (1)}$$

where output is the sensor output, A is the amplitude of the generated sine and cosine signals, offset is the vertical offset of the sinusoidal signals with respect to ground, and k is any real number, where k affects the gain and vertical offset of the final sensor output. In general, the value for k should be set so that the mathematical value of the output falls within the desired operational range.

Figure 2:
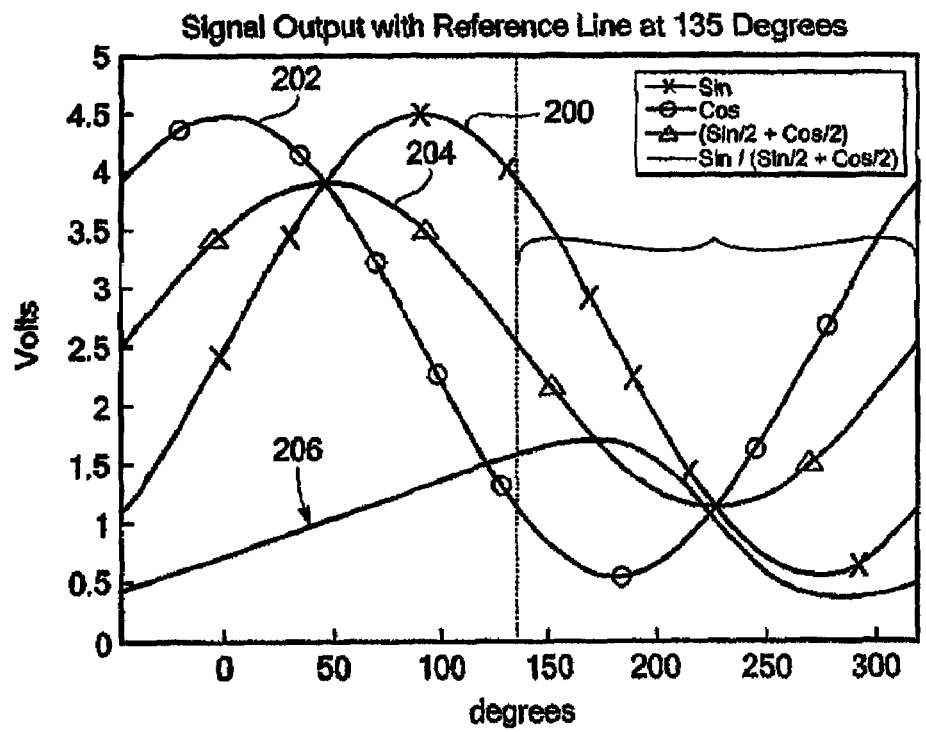
FIG. 2 is a graphical depiction of modeled sine and cosine signals, an average of the sine and cosine signals, and an output signal based upon the relationships of Equation 1.

FIG. 2 shows modeled input sinusoidal signals and output for Equation 1. A sine wave 200 and cosine wave 202 are shown as well as an average signal 204 of the sine and cosine signals. The output signal 206 (sin/(sin/2+cos/2) is also shown. Note that sin/(sin/2+cos/2) embodies the amplitudes and offsets associated with the sinusoids as described by Equation 1. As can be seen, Equation 1 produces an output signal 206 with a high degree of linearity in a first region of about 315° to 135° if the relationships in Equations 2 and 3 below hold:

$$\text{offset} = \frac{\text{supply\_voltage}}{2} \qquad \text{Eq (2)}$$

$$A = \frac{\text{supply\_voltage}}{2} - 0.5 \text{ volts} \qquad \text{Eq (3)}$$

In a second region of 135°-315°, the input sinusoids are inverted around the offset voltage as compared to the first region. The illustrated model assumes that A=2 volts, offset=2.5 volts, and k=2.

Figure 3:
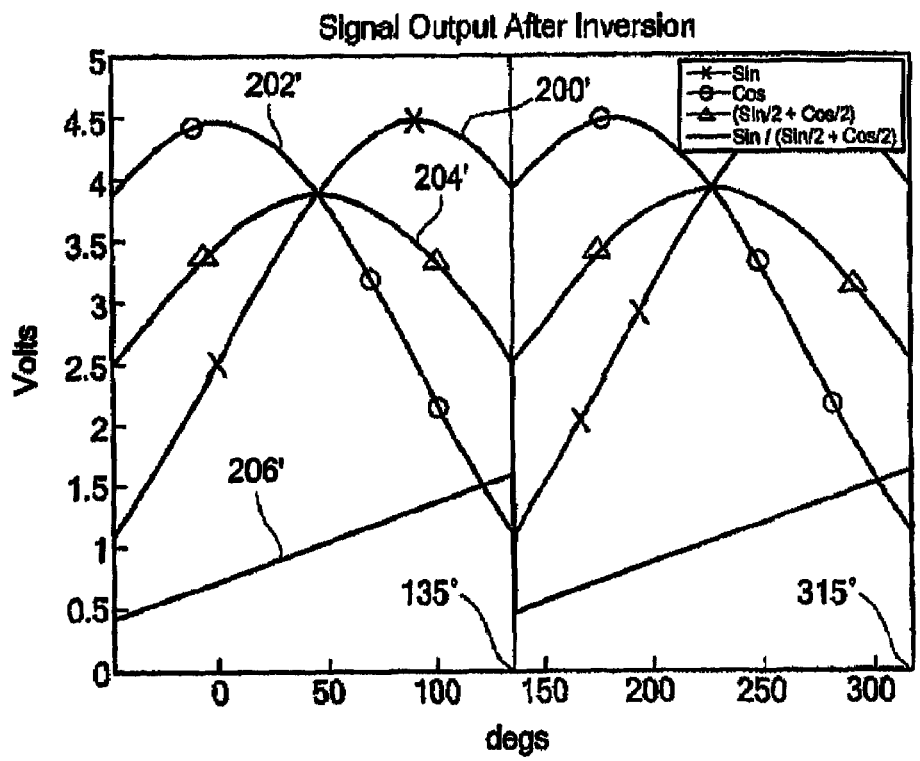
FIG. 3 is a graphical depiction of modeled sine, cosine, average, and output signals with an inverted region.

Using these observations, the model for Equation 1 can be modified so that the output signal has the same degree of linearity in both regions and is periodic over the two regions. In one particular embodiment, this modification is performed by inverting the waveforms if they fall within the range of 135°-315° (the second region), as shown in FIG. 3. As shown, the sine waveform 200', cosine waveform 202', and average signal 204', are inverted in the range of 135° to 315°, which corresponds to $-\sin(\theta) > \cos(\theta)$ where $-\sin(\theta)$ refers to the inversion of the sine wave about an offset voltage, $\sin(\theta)$ and $\cos(\theta)$ embody the amplitudes and offsets associated with the sinusoids as described by Equation 1. Exemplary parameters are A=2 volts, offset=2.5 volts, and k=2.

Figure 4:
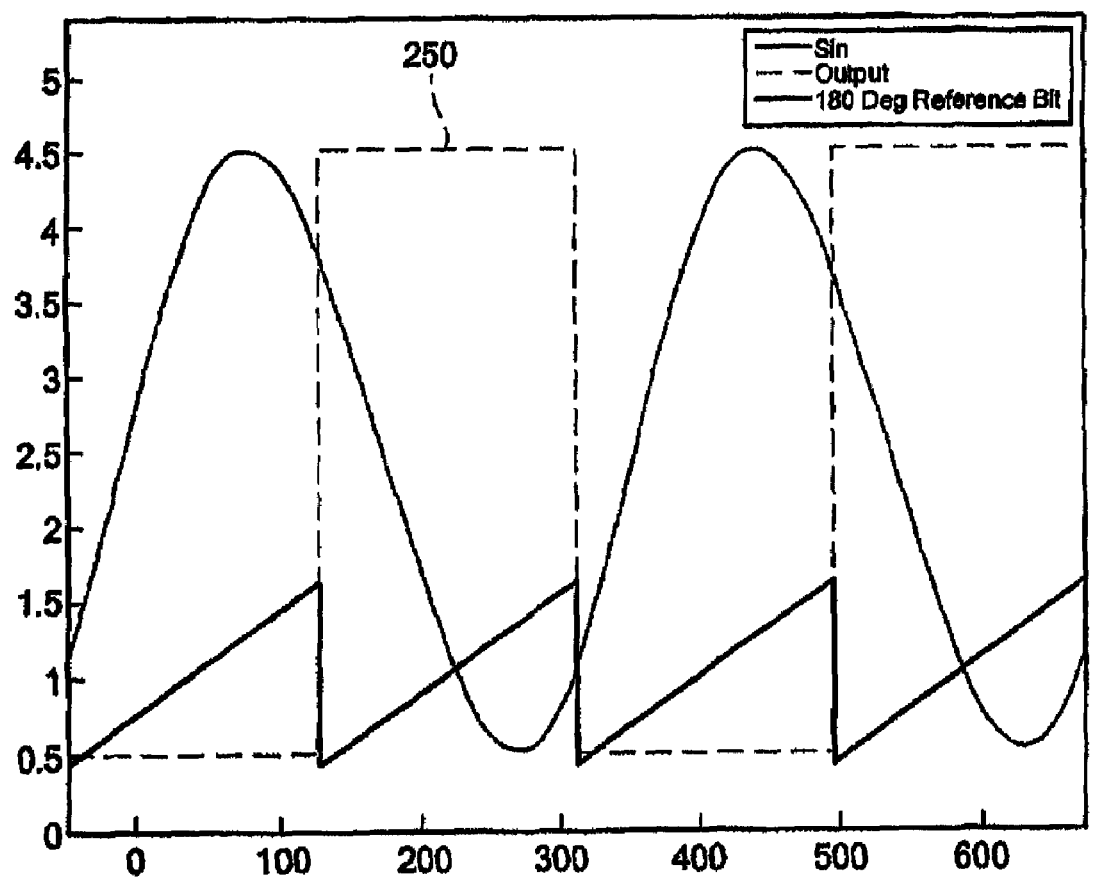
FIG. 4 is a graphical depiction showing a region indicator signal for linear and non-linear output regions.

As shown in FIG. 4, the inversion or second region of 135°-315° can be identified using a region indicator 250, which can be provided as a bit, that indicates whether $-\sin(\theta) > \cos(\theta)$, where $-\sin(\theta)$ refers to the inversion of the sine wave about an offset voltage, $\sin(\theta)$ and $\cos(\theta)$ embody the amplitudes and offsets associated with the sinusoids. As noted above, the modified model of Equation 1 produces an output that is periodic over a range of 180°. In order to provide a 360° sensing range, the first and second regions can be defined using the following:

if $-\sin(\theta) > \cos(\theta)$
    output region = 0° – 180° (first region where θ ranges from 315° to 135°)
else
    output region = 180° – 360° (second region where θ ranges from 135° to 315°)

Alternatively, the region indicator 250 can be used to vertically shift up the sensor output of the 180°-360° or second region to create a linear ramp. The magnitude of the vertical shift is dependent on the variable k.

Figure 5:
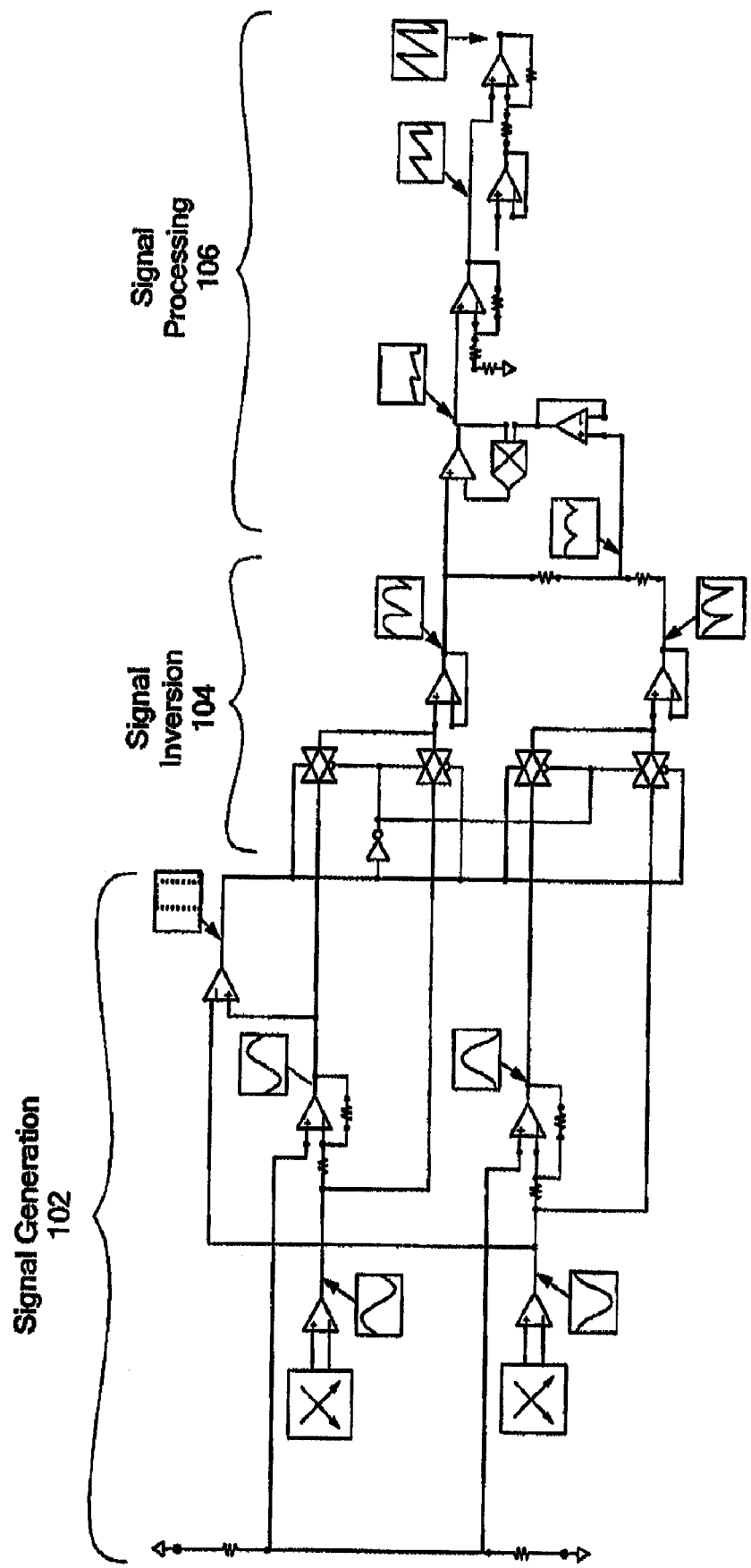
FIG. 5 is an exemplary circuit implementation of an analog angle sensor in accordance with the present invention.

FIG. 5 shows an exemplary circuit implementation for an analog position sensor 200 in accordance with the present invention. The sensor 200 includes exemplary implementations for the signal generation, signal inversion, and signal processing modules 102, 104, 106 of FIG. 1, which are described in detail below.

Figure 6:
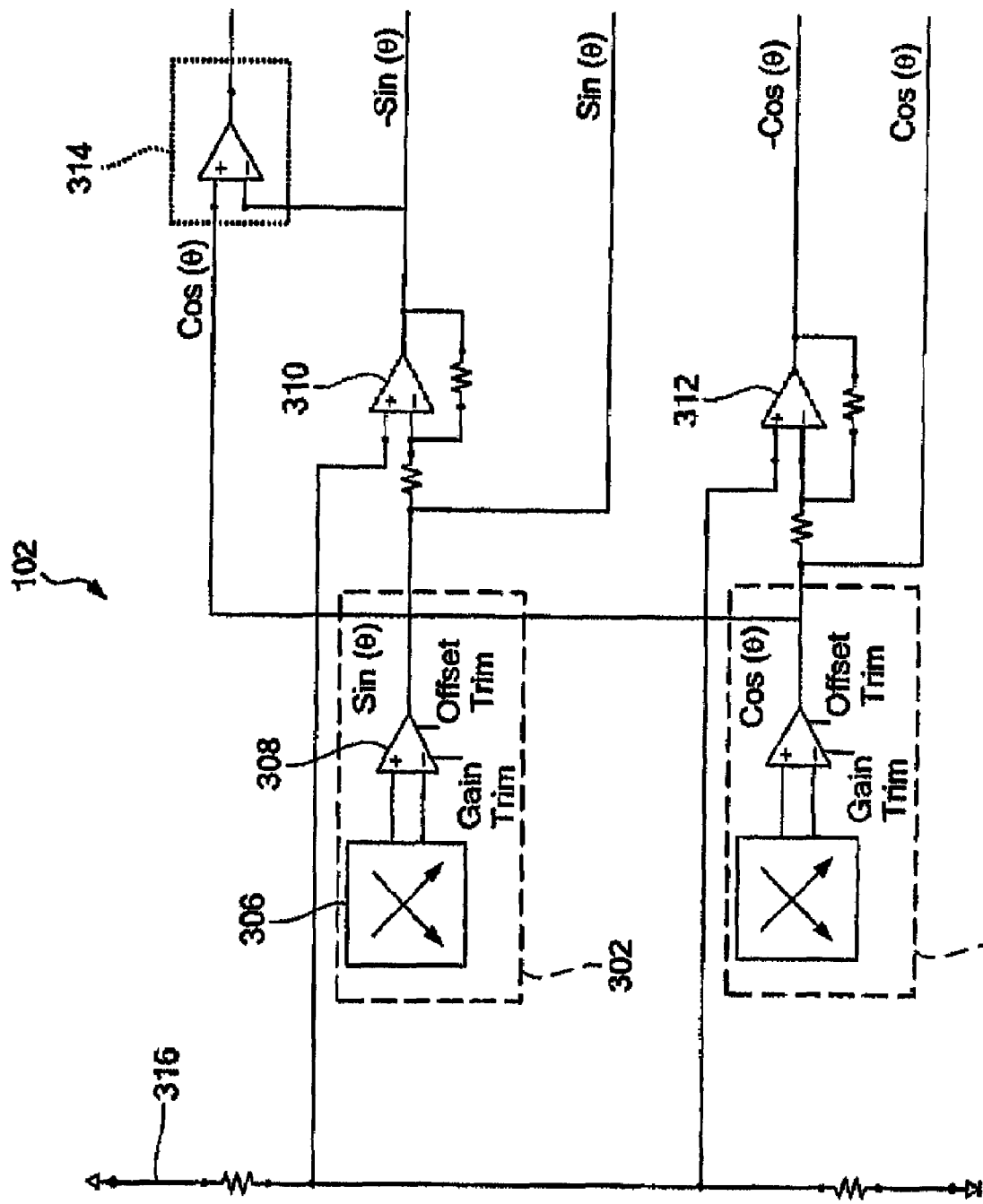
FIG. 6 is a circuit diagram of a signal generation portion of the circuit of FIG. 5.

FIG. 6 shows one circuit implementation of a signal generation module 102 including first and second Hall effect devices 302, 304, each of which includes a Hall plate 306 and an amplifier 308 having offset trim and gain trim inputs. Alternatively, gain and offset trim values can be adjusted, such as by automatic gain control and/or automatic offset adjust. The first Hall effect device 302 outputs a sin(θ) signal and the second Hall effect device 304 outputs a cos(θ) signal, where θ represents a position of the rotating magnet.

While the illustrated embodiment provides for the generation of sinusoidal signals using linear Hall effect devices, a variety of other magnetic sensors can be used, such as a magnetoresistor (MR), a magnetotransistor, a giant magnetoresistance (GMR) sensor, or an anisotrpic magnetoresistance (AMR) sensor. In addition, while sinusoidal waveforms are shown, it is understood that other suitable waveforms can be used to meet the needs of a particular application.

Figure 7:
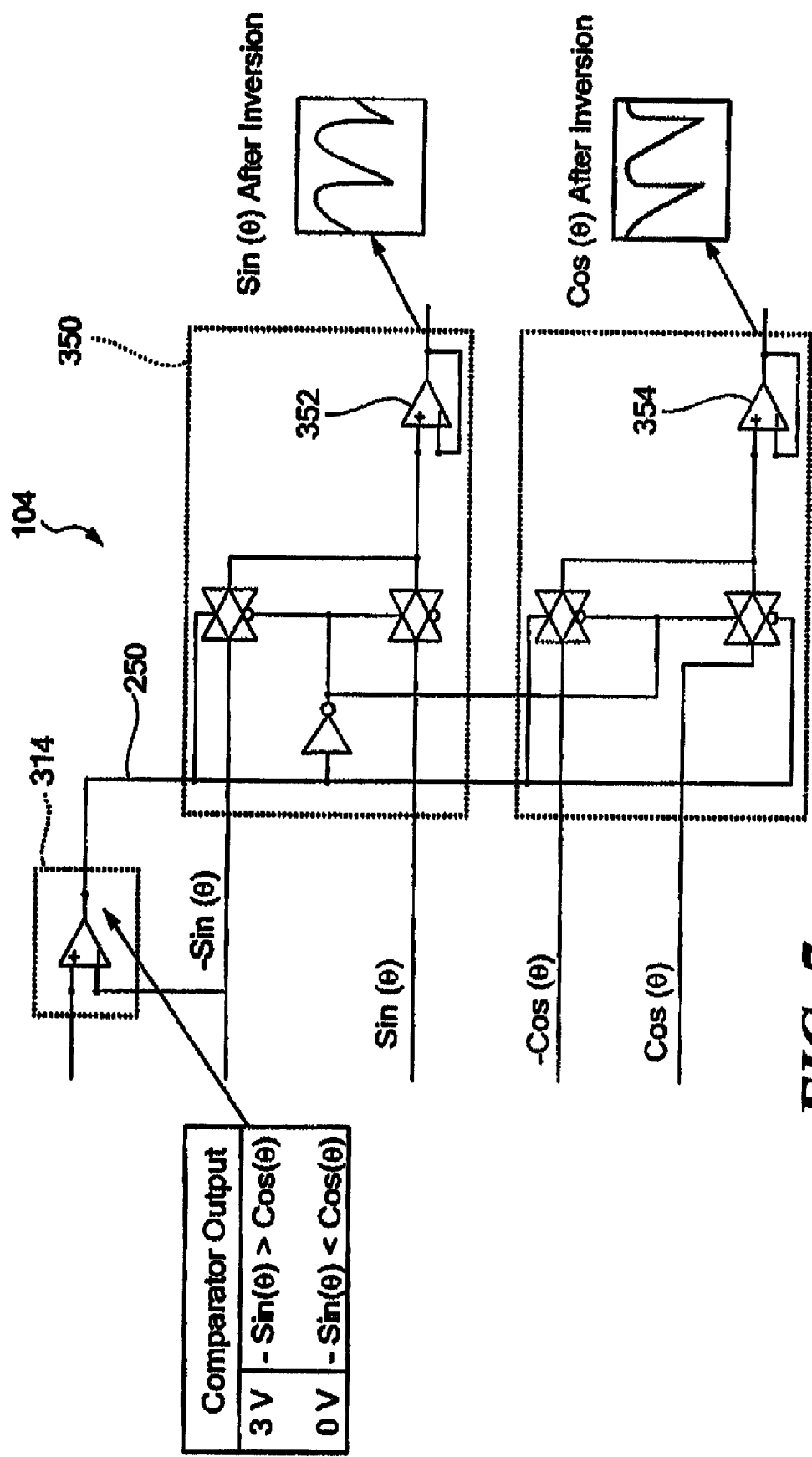
FIG. 7 is a circuit diagram of a signal inversion portion of the circuit of FIG. 5.

A first signal inverter 310 inverts the sin(θ) signal to provide a −sin(θ) signal (where −sin(θ) is inverted about an offset) and second signal inverter 312 inverts the cos(θ) signal to provide a −cos(θ) signal (where −cos(θ) is inverted about an offset). With the inverters 310, 312, each of sin(θ), −sin(θ), cos(θ), and −cos(θ) signals are available to the signal inversion module 104 (FIG. 7). A comparator 314 receives as inputs cos(θ) and −sin(θ) to generate a region indicator bit (inverted or non-inverted sin and cos signals as noted above). The comparator 314 implements the −sin(θ)>cos(θ) determination described above to generate the region indicator bit.

The signal generation module 102 also includes a regulated voltage supply 316, e.g., 5V, and a bias reference voltage 318, e.g., 2.5V. While a supply voltage of 5V is used in an exemplary embodiment, the particular voltage used can be varied while still meeting the relationships set forth in Equations (2) and (3) hold.

FIG. 7 shows an exemplary signal inversion module 104 circuit implementation to invert the sinusoidal signals generated from the magnetic sensors 302, 304 (FIG. 6) in the 135°-315° (second) region. In the illustrative implementation, the original (sin(θ) and cos(θ)) signals and the inverted signals (−sin(θ) and −cos(θ)) are provided as inputs to a 2-input analog multiplexer 350. The comparator 314 output, which can correspond to the region indicator bit 250 of FIG. 4, controls the output of the multiplexer 350. That is, the region indicator bit 250 determines whether inverted or non-inverted signals are output from the analog multiplexer 250. The multiplexer 250 outputs can be buffered with respective amplifiers 352, 354 for input to the signal processing module 106 (FIG. 8).

Figure 8:
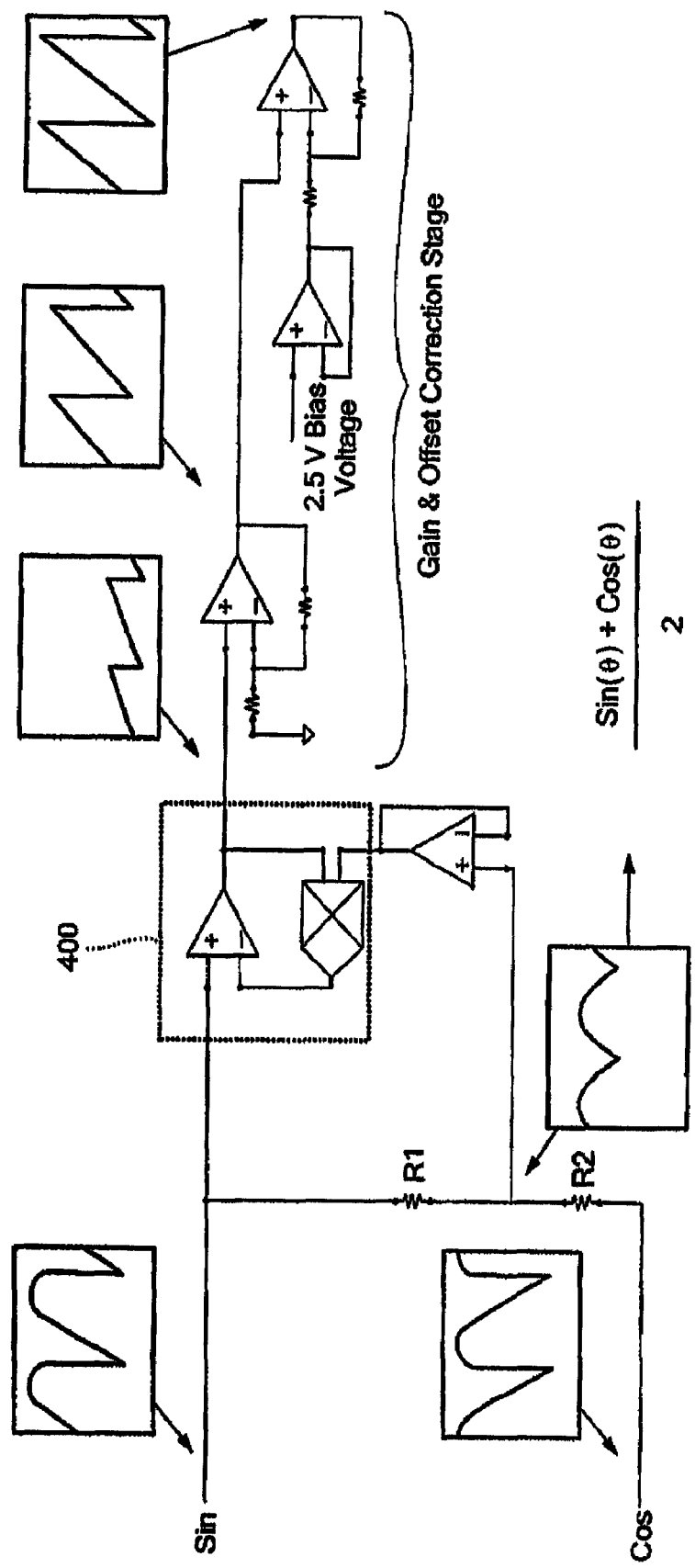
FIG. 8 is a circuit diagram of a signal processing portion of the circuit of FIG. 5.

FIG. 8 shows an exemplary signal processing circuit 106 implementation that uses a resistive divider having first and second resistors R1, R2 to implement the gain factor k. Note that this for works because k=2 in the exemplary embodiment, recalling that $$\text{output} = \frac{A\sin(\theta) + \text{offset}}{\frac{1}{k}(A\sin(\theta) + A\cos(\theta) + 2\text{offset})} \qquad \text{Eq (1)}$$

The point between the resistors R1, R2 provides (sin(θ)+cos(θ))/2. This signal is buffered and input to the analog multiplier 400. The sin(θ) signal is provided as a second input (numerator in Eq. 1) to the analog multiplier 400, which provides implicit division using the analog multiplier 400. It is understood that the circuit includes the waveform inversion for multi-region linearity in accordance with Equation 4.

In one particular embodiment, the analog multiplier 400 operates on a single supply and assumes that ground is equal to mathematical zero. It is understood that other circuit embodiments can operate with a variety of voltages, e.g., 0.5V, as "ground" to avoid effects associated ground variance, for example. Note that this division operation only requires two-quadrant division (or multiplication), since both incoming signals are assumed to be mathematically positive. The output from the analog multiplier 400 is processed to provided gain and offset correction for output in a range of 0.5V to 4.5V, in the illustrated embodiment.

The circuits of FIG. 5 can be implemented on a single substrate using processes and techniques well known to one of ordinary skill in the art While the invention is primarily shown and described as implementing a particular algebraic relationship to achieve an analog position sensor on a single substrate, it is understood that other algebraic relationships can be implemented.

In another embodiment, an alternative algorithm can be implemented as described below. Referring again to Equation 1, $$\text{output} = \frac{A\sin(\theta) + \text{offset}}{\frac{1}{k}(A\sin(\theta) + A\cos(\theta) + 2\text{offset})} \quad \text{Eq (1)}$$

where output is the sensor output, A is the amplitude of the generated sine and cosine signals, offset is the vertical offset of the sinusoidal signals with respect to ground, and k is any real number, where k affects the gain and vertical offset of the final sensor output.

To reflect inversion, Equation 1 can be mathematically represented as set fort in Equation 4:

$$\text{output} = \frac{\pm A\sin(\theta) + \text{offset}}{\frac{A}{k}(\pm \sin(\theta) \pm \cos(\theta)) + 2\text{offset}} \quad \text{Eq. (4)}$$

or, as in Equation 5 below:

$$\text{output} = \frac{A\sin(\theta) \pm \text{offset}}{\frac{A}{k}(\sin(\theta) + \cos(\theta)) \pm \text{offset}} \quad \text{Eq. (5)}$$

The inversion is then applied, i.e., the "−" term when:

$$2\text{offset} - (A\sin(\theta) + \text{offset}) > A\cos(\theta) + \text{offset} \quad \text{Eq. (6)}$$

or $$\frac{A\sin(\theta) + A\cos(\theta) + 2\text{offset}}{2} < \text{offset} \quad \text{Eq. (7)}$$

To obtain an alternative form of the algorithm, Equation 5 can be simplified as follows:

Multiply numerator and denominator by k/A to generate the result in Equation 8:

$$\text{output} = \frac{k\sin(\theta) \pm \frac{k \times \text{offset}}{A}}{\sin(\theta) + \cos(\theta) \pm \frac{k \times \text{offset}}{A}} \quad \text{Eq. (8)}$$

Insert an add and subtract cos(θ) term in the numerator as shown Equation (9):

$$\text{output} = \frac{k\sin(\theta) + \cos(\theta) - \cos(\theta) \pm \frac{k \times \text{offset}}{A}}{\sin(\theta) + \cos(\theta) \pm \frac{k \times \text{offset}}{A}} \quad \text{Eq. (9)}$$

Insert an add and subtract sin(θ) term in the numerator per Equation 10.

$$\text{output} = \frac{k\sin(\theta) - \sin(\theta) - \cos(\theta) + \sin(\theta) + \cos(\theta) \pm \frac{k \times \text{offset}}{A}}{\sin(\theta) + \cos(\theta) \pm \frac{k \times \text{offset}}{A}} \quad \text{Eq. (10)}$$

Factor out sin(θ) from the "k sin(θ)−sin(θ)" term in the numerator as in Equation 11.

$$\text{output} = \frac{(k-1)\sin(\theta) - \cos(\theta) + \sin(\theta) + \cos(\theta) \pm \frac{k \times \text{offset}}{A}}{\sin(\theta) + \cos(\theta) \pm \frac{k \times \text{offset}}{A}} \quad \text{Eq. (11)}$$

Note the common $$\text{"}\sin(\theta) + \cos(\theta) \pm \frac{k \times \text{offset}}{A}\text{"}$$

in both the numerator and the denominator. Equation 11 can be rewritten as in Equation 12:

$$\text{output} = 1 + \frac{(k-1)\sin(\theta) - \cos(\theta)}{\sin(\theta) + \cos(\theta) \pm \frac{k \times \text{offset}}{A}} \quad \text{Eq. (12)}$$

Note that if one recognizes that the constant term "1" is a DC offset, then one can eliminate the offset since it will not change the overall linearity of the output as in Equation 13.

$$\text{output} = \frac{(k-1)\sin(\theta) - \cos(\theta)}{\sin(\theta) + \cos(\theta) \pm \frac{k \times \text{offset}}{A}} \quad \text{Eq. (13)}$$

Now consider that k is a constant that only affects the final gain and offset of the output. This constant can be fixed so that k=2, as in the example described above. This can be represented in Equation 14:

$$\text{output} = \frac{\sin(\theta) - \cos(\theta)}{\sin(\theta) + \cos(\theta) \pm \frac{2 \times \text{offset}}{A}} \qquad \text{Eq. (14)}$$

Since $\sin(\theta)+\cos(\theta)=\sqrt{2}\sin(\theta+45°)$ and $\sin(\theta)-\cos(\theta)=\sqrt{2}\sin(\theta-45°)$, as is well known, Equation 14 can be rewritten as Equation 15:

$$\text{output} = \frac{\sqrt{2}\sin(\theta - 45°)}{\sqrt{2}\sin(\theta + 45°) \pm \frac{2 \times \text{offset}}{A}} \qquad \text{Eq. (15)}$$

Dividing the numerator and denominator of the right side of the equation by $\sqrt{2}$ results in the relationship of Equation 16:

$$\text{output} = \frac{\sin(\theta - 45°)}{\sin(\theta + 45°) \pm \frac{\sqrt{2} \times \text{offset}}{A}} \qquad \text{Eq. (16)}$$

Note that the sinusoidal term in the numerator, $\sin(\theta-45°)$, differs from the sinusoidal term in the in the denominator, $\sin(\theta+45°)$, by a phase of 90°. Because of this, one can replace the numerator and denominator with $\sin(\theta)$ and $\cos(\theta)$ respectively, as shown in Equation 17 below:

$$\text{output} = \frac{\sin(\theta)}{\cos(\theta) \pm \frac{\sqrt{2} \times \text{offset}}{A}} \qquad \text{Eq. (17)}$$

This changes the inversion point (i.e. application of the "−" term) to: 0>cos(θ). Also, the phase of the output is now aligned identically with arc tangent rather than being out of phase with arc tangent by 45°.

Note that the sinusoids now have unity gain: sin(θ) has zero offset, whereas cos(θ) has a finite offset (i.e., cos(θ) has an offset equal to $$\frac{\sqrt{2} \times \text{offset}}{A}$$

Since the variables A and offset no longer represent the real gain and offset of the sinusoids one should identify this constant as a number, which can be referred to as b. Rewriting again results in the relationship set forth in Equation 18:

$$\text{output} = \frac{\sin(\theta)}{\cos(\theta) \pm b} \qquad \text{Eq. (18)}$$

The linearity of the output depends upon the value of the constant term. The previous example showed that A=2 and offset=2.5V. In a straightforward 'guess', the ideal constant term of b is approximately equal to 1.7678. The linearity of the output can be improved slightly by varying the value of b.

It will be appreciated that the relationship of Equation 18 can be scaled as desired, such as to fit the original specifications above. If sin(θ) and cos(θ) have some gain, A, then the constant b must also become a function of A as set forth in Equation 19:

$$\text{output} = \frac{A\sin(\theta)}{A\cos(\theta) \pm Ab} \qquad \text{Eq. (19)}$$

It is possible to know the value of A by using automatic gain control or using the well known trigonometric relationship of Equation 20:

$$A = \sqrt{(A\sin(\theta))^2 + (A\cos(\theta))^2} \qquad \text{Eq. (20)}$$

Figure 9:
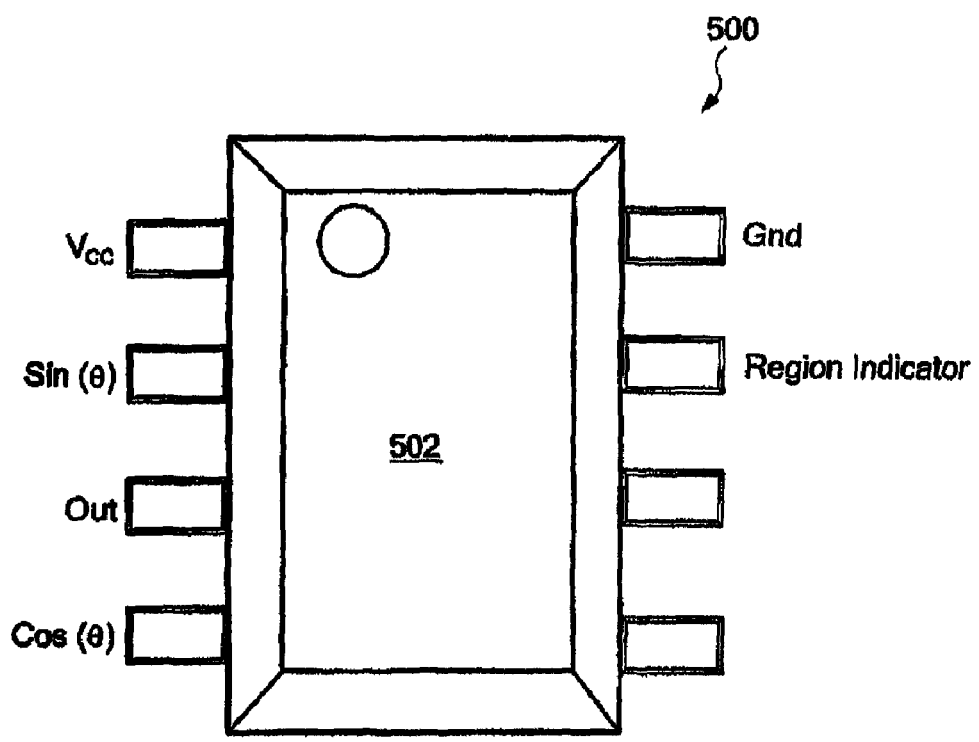
FIG. 9 is a pictorial representation of an exemplary sensor package in accordance with the present invention.

FIG. 9 shows an exemplary sensor package 500 having an illustrative pinout of Vcc and Gnd with sin(θ) and cos(θ) pins, a region indicator, and position output signal. It will be appreciated that a variety of pinout configurations are possible. In one embodiment, the sensor package includes a sensor on a single substrate 502.

For exemplary sensor implementations, it may be desirable to provide an output of the angle sensor that is ratiometric with the supply voltage so that it can interface with the LSB (least significant bit) of various circuits, such as ADCs (analog to digital converters). In order for the output of the division stage, such as the one described above, to be ratiometric with the supply voltage, the following relationships can be applied: k=0.4*Supply, A=0.4*Supply, and the offset=0.5*Supply. As long as these relationships hold, the sensor output will scale ratiometrically. Alternatively, assuming that Supply=5V, then if you only allowed A and offset to be ratiometric, the output of the divider stage will be exactly the same regardless of how low the supply drops (assuming it does not clip the output). Ratiometry can be achieved by scaling the output of the division stage by Supply/5. It is understood that ratiometry can be achieved using other mechanisms.

Figure 9A:
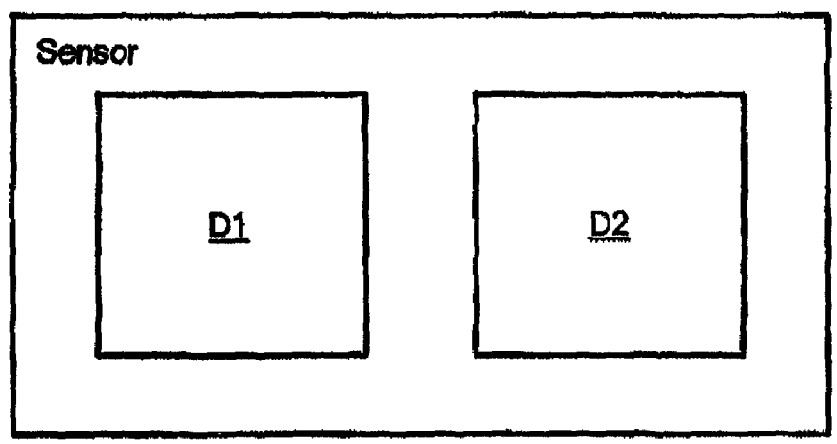
FIG. 9A is a block diagram of a sensor having first and second dies.

Implementing an analog sensor on a single substrate in accordance with exemplary embodiments of the invention provides smaller packages with fewer components as compared with convention sensors having digital signal processing cores. In one particular embodiment, a sensor includes AMR and circuitry on a single die. In other embodiments, angle sensors can have multiple dies, such as for GMR, AMR, GaAs, and various silicon Hall sensors. In one particular embodiment shown in FIG. 9A, an angle sensor includes multiple dies with a first die D1 in a CMOS process for the circuits and a second die D2 providing a different Hall plate doping for the sensor. Other embodiments include one die with signal processing and two GaAs die and/or two MR die. It should be noted that the GMR die act in a different plane of sensitivity so that the sensors need to be positioned appropriately, for example closer to the center of the axis of rotation. In addition, manufacturing costs will be reduced and steady state conditions will be reached sooner than in conventional devices.

In another aspect of the invention, an angle sensor increases sinusoidal frequency to provide higher output resolution. It is known that rotating a diametrically bipolar disc magnet above two 90° mechanically offset magnetic sensors will generate a sin/cosine signal pair as the output of the magnetic sensors. One 360° revolution of the magnet will correspond with one period of the sine and cosine signals. By increasing the frequency of the sinusoids over one 360° revolution, higher output resolution is achieved in angle sensing.

As described above, a pair of sine/cosine signals for angle sensing applications can be generated by placing two magnetic sensors at a 90° mechanical offset around the center of a rotating diametrically bipolar disc magnet. Placing two Hall plates at a 90° mechanical offset around the center of a diametrically bipolar disc magnet produces a sine/cosine signal pair.

Figure 10:
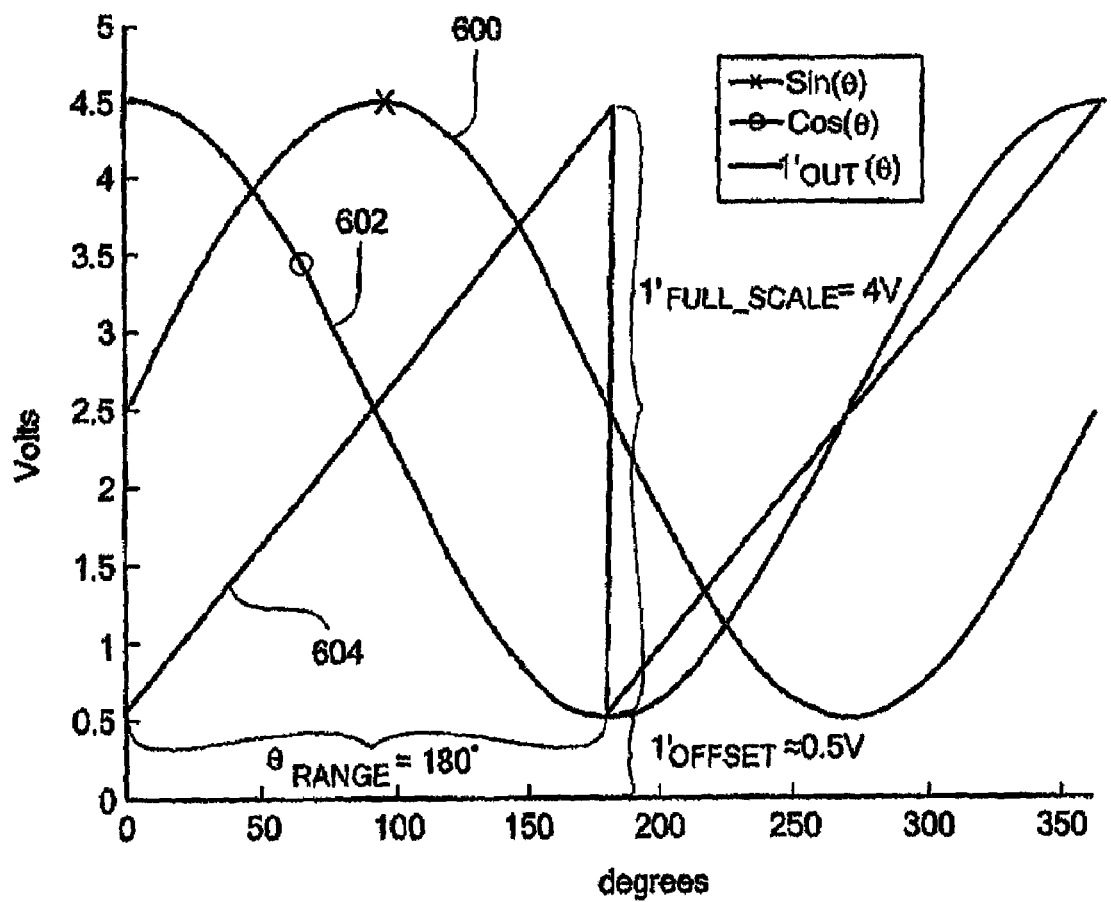
FIG. 10 is a graphical depiction of signals generated by an angle sensor in accordance with exemplary embodiments of the invention.

When these two sinusoids are used as input to an angle-sensing algorithm, such as the algorithm described above in Equation 1, the output appears as shown in FIG. 10. The maximum angular error of the output is calculated as follows in Equation 21:

$$V_{ERROR\_MAX} = \text{MAX}\left(\theta_{EXPECTED}(\theta) - \frac{V_{OUT}(\theta) - V_{OFFSET}}{V_{FULL\_SCALE}} \times \theta_{RANGE}\right) \quad \text{Eq. (21)}$$

where $\theta_{EXPECTED}(\theta)$ is the expected angular output at a given angle $\theta$, $V_{OUT}(\theta)$ is the expected output voltage of the magnetic sensor at a given angle $\theta$, $V_{OFFSET}$ is the offset of the output voltage, $V_{FULL\_SCALE}$ is the full scale voltage range of the output voltage, and $\theta_{RANGE}$ is the angular range of the output voltage ramp. The sine and cosine signals 600, 602 are shown as well as the output voltage $V_{OUT}(\theta)$ 604.

Observe in Equation 21 that the error is a function of the angular range of the output $\theta_{RANGE}$. The maximum angular error ($V_{ERROR\_MAX}$) can be reduced if $\theta_{RANGE}$ is decreased while the other variables remain fixed.

Figure 11:
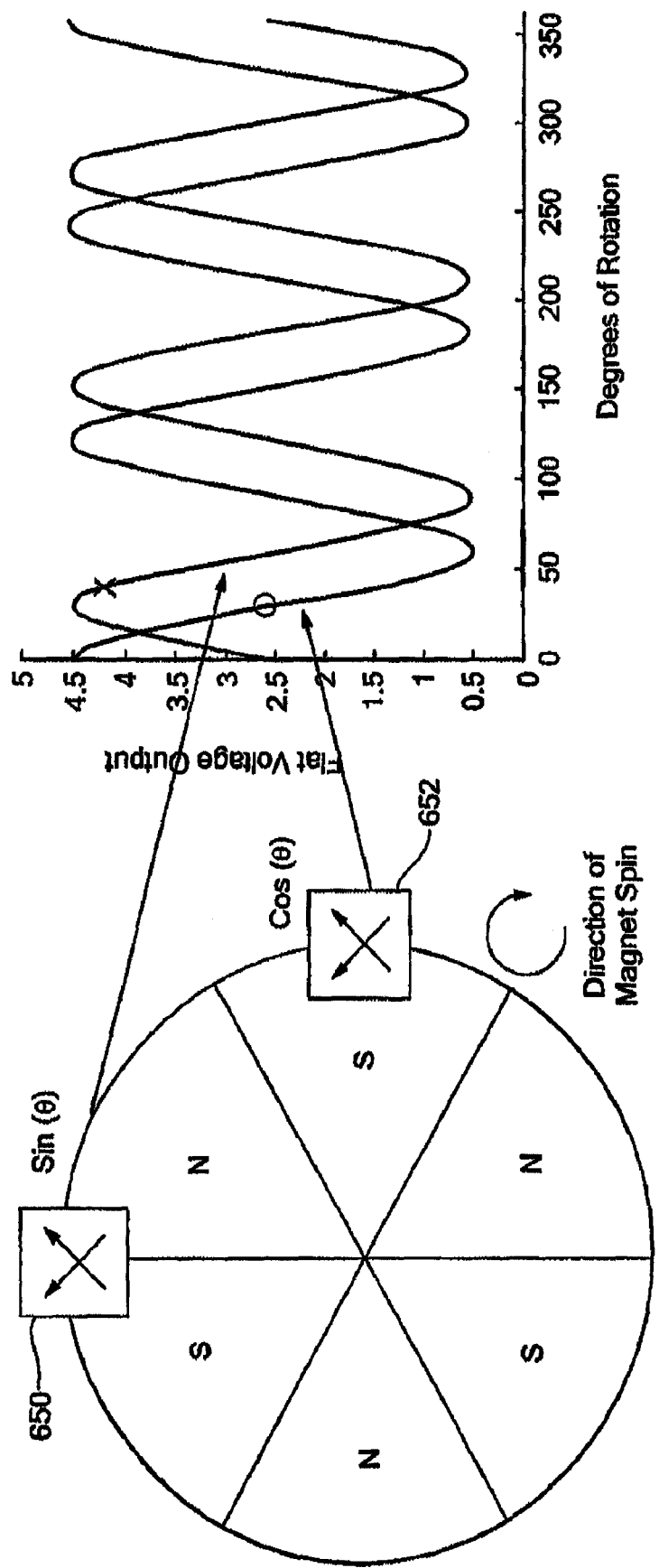
FIG. 11 is a pictorial representation of a ring magnet and sensors and sine and cosine signals.
Figure 11A:
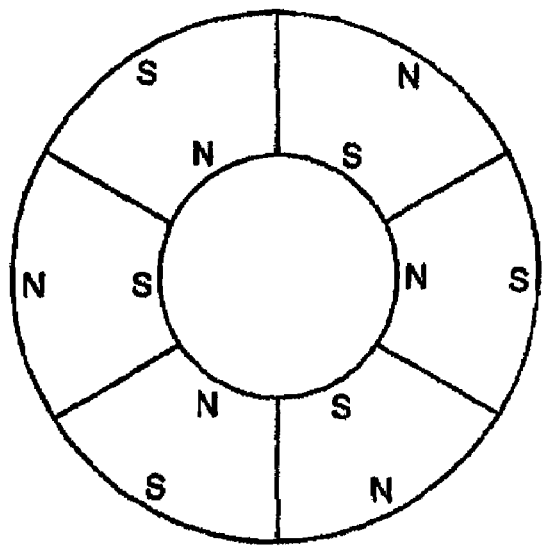
FIG. 11A is a pictorial representation of a multi-pole magnet in a donut shape that can generate sine and cosine signals.
Figure 12:
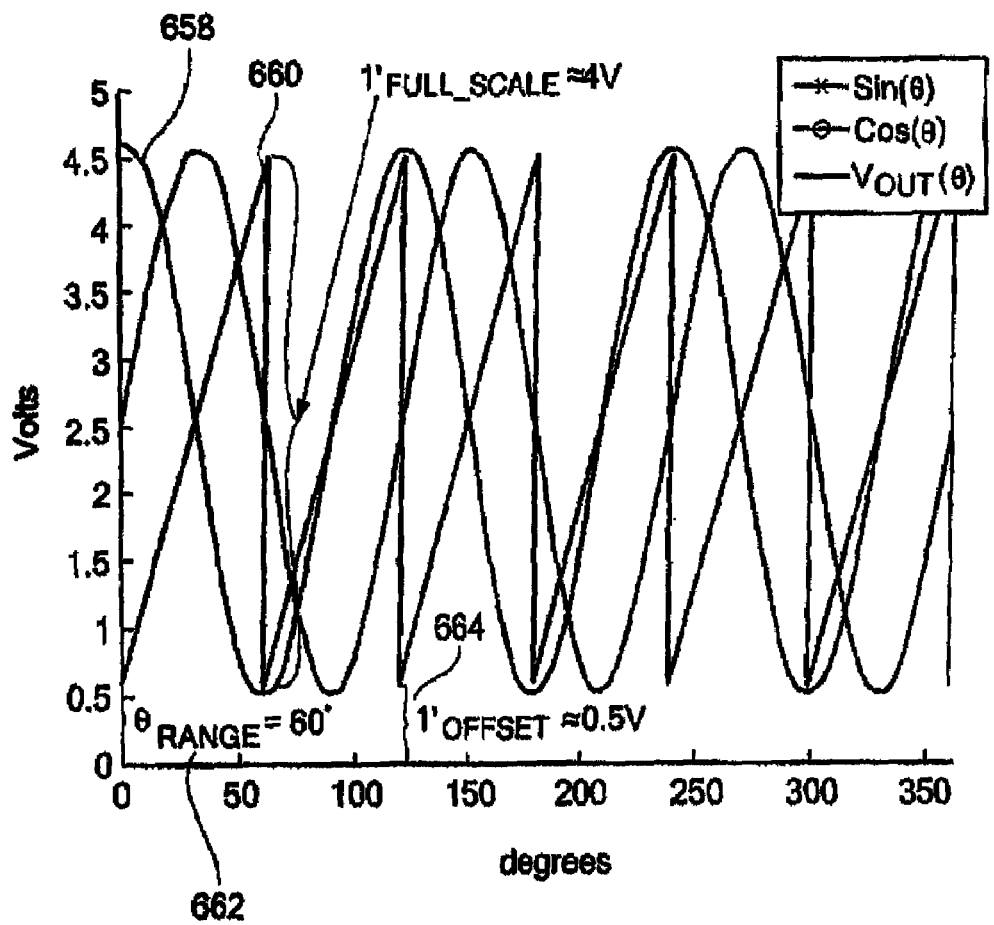
FIG. 12 is a graphical depiction of signals generated by the arrangement of FIG. 11.

It is possible to decrease $\theta_{RANGE}$ by increasing the frequency of the sinusoids over one 360° rotation of the magnet. If a ring magnet, for example, is used in place of a diametrically bipolar disc magnet then more sinusoids can be generated in a single rotation. For example, if a three-pole pair magnet is used, then the frequency of the sinusoids increases by a factor of three, as shown in FIG. 11, and therefore, $\theta_{RANGE}$ decreases by a factor of three as shown in FIG. 12. If $\theta_{ORANGE}$ decreases by a given factor, then $V_{ERROR\_MAX}$ will decrease by the same factor. FIG. 11A shows an alternative embodiment showing a multi-pole 'donut' magnet. Magnetization is radially outward from the center.

In the configuration of FIG. 11, first and second sensors 650, 652 are offset by ninety degrees on a ring magnet 654 having an odd number, i.e., three, of poles. FIG. 12 graphically shows signals for the configuration of FIG. 11. The sine, cosine and output $V_{OUT}$ signals 656, 658, 660, as well as $\theta_{RANGE}$ 662 and $V_{OFFSET}$ 664.

The decrease in error is shown in the calculations of Equation 22 and Equation 23 below.

$$V_{ERROR\_MAX} = \text{MAX}\left(\frac{\theta_{EXPECTED}(\theta)}{3} - \frac{V_{OUT}(\theta) - V_{OFFSET}}{V_{FULL\_SCALE}} \times \frac{\theta_{RANGE}}{3}\right) \quad \text{Eq. (22)}$$

$$V_{ERROR\_MAX} = \frac{1}{3}\text{MAX}\left(\theta_{EXPECTED}(\theta) - \frac{V_{OUT}(\theta) - V_{OFFSET}}{V_{FULL\_SCALE}} \times \theta_{RANGE}\right) \quad \text{Eq. (23)}$$

It is understood that increasing the frequency of the sinusoids with a ring magnet can be applied to any number of pole-pair combinations. Note that a given ring magnet can have several different possible sensor placements that generate the same $\sin(\theta)$ and $\cos(\theta)$ signals. While exemplary embodiments are shown and described as having a ring magnet, it is understood that other suitable devices can be used to generate waveforms.

Figure 13:
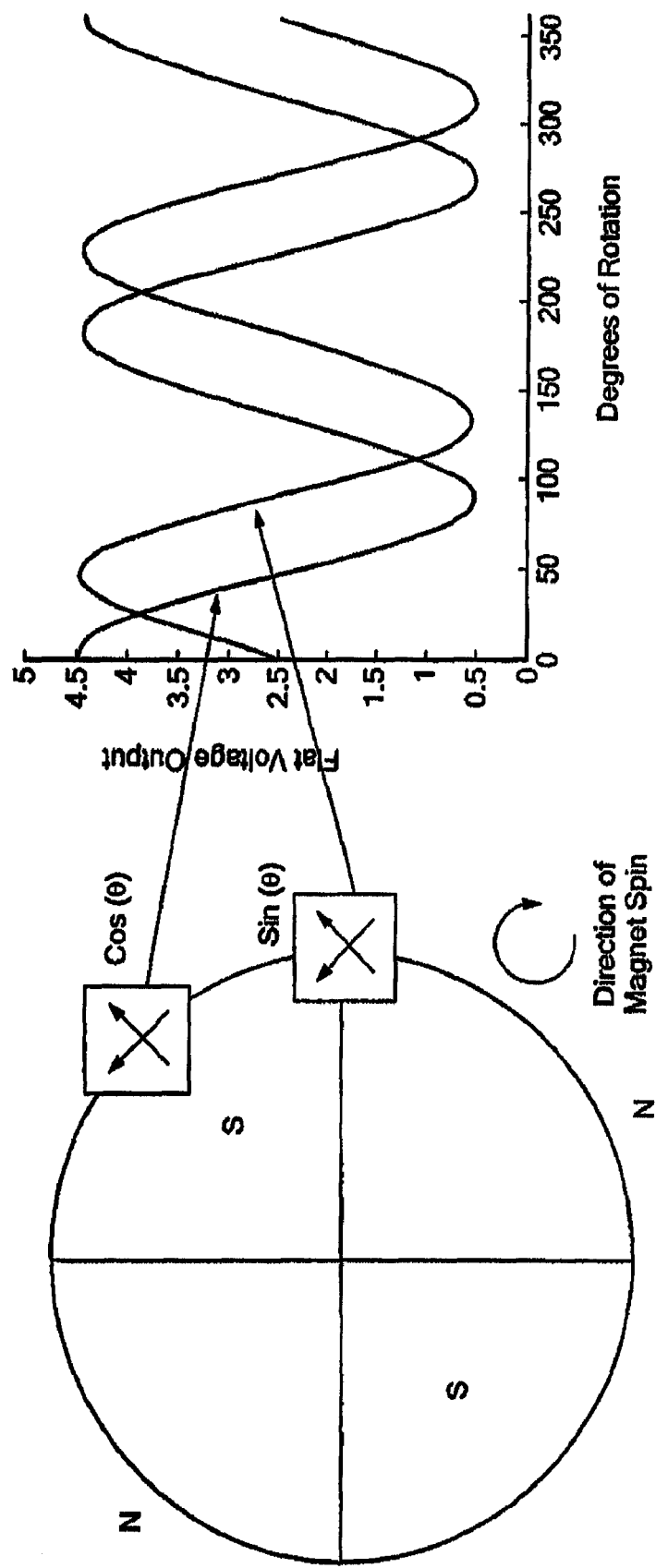
FIG. 13 is a pictorial representation of a ring magnet and sensors and sine and cosine signals.
Figure 14:
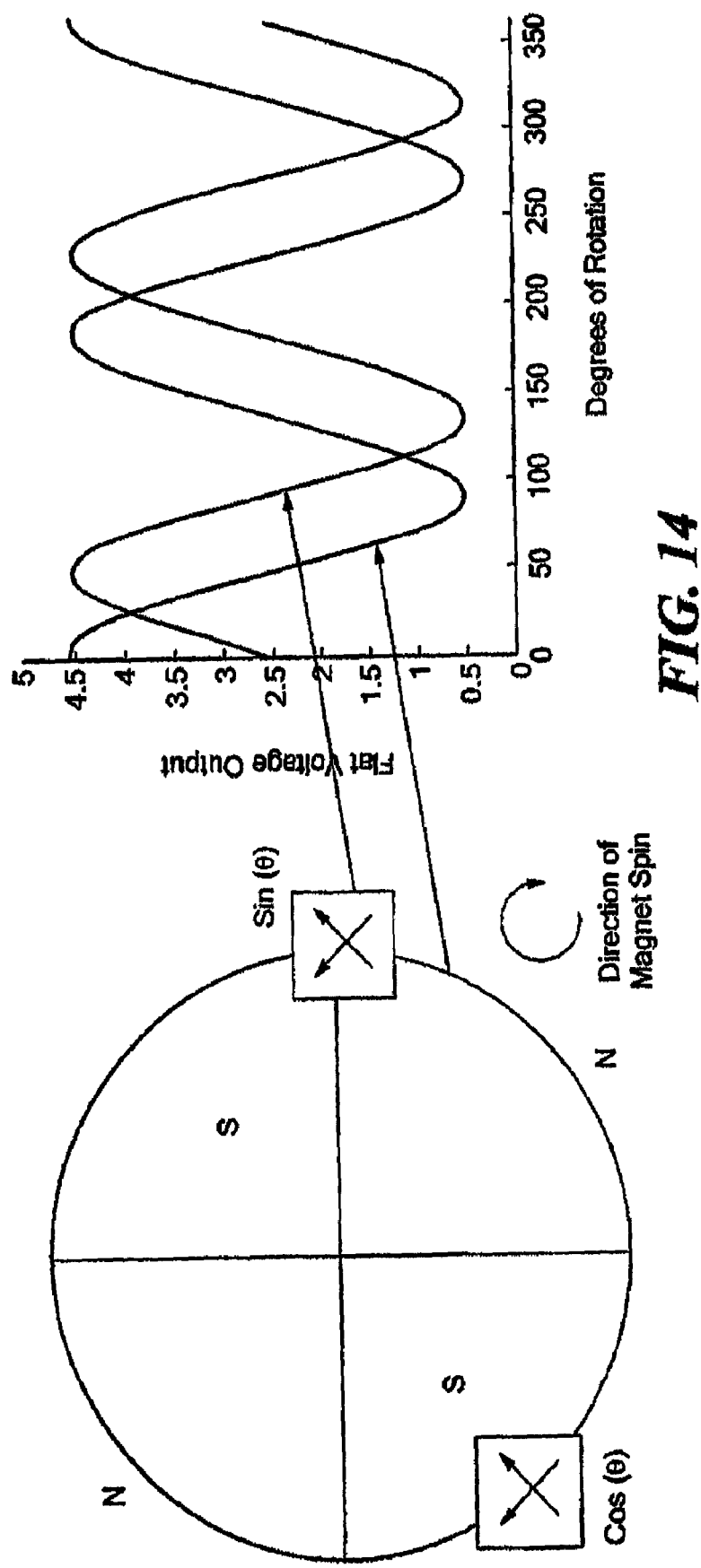
FIG. 14 is another pictorial representation of a ring magnet and sensors and sine and cosine signals.

FIGS. 13 and 14 show exemplary magnetic sensor placements for a ring magnet with two pole-pairs. FIG. 13 shows a ring magnet 700 having first and second pole pairs. A first sensor 702 is placed at an intersection of north/south, and the second sensor 704 is placed in the adjacent south pole for a separation of about forty-five degrees. FIG. 14 shows a ring magnet 750 having a first sensor 752 at an intersection of north/south poles and a second sensor in the non-adjacent south pole for a separation of about 135 degrees. As can be seen the resultant sine and cosines signals are the same for both configurations.

As described above, a region indicator bit can be used to distinguish two adjacent output ramps over a single period of the sinusoidal input.

In multi-pole embodiments, a region indicator bit can be used to distinguish the multiple output ramps over a 360 degree rotation of a ring magnet. Using the region indicator bit as input to a counter, one can determine the angular region of operation of the magnet. The counter can reset back to zero after cycling through all of the regions. This approach will work as long as the device starts in a known angular region (e.g. 0-90°, for the case of four regions of magnetization for the "magnet") and the magnet is rotated in one direction. If the magnet rotates in both directions it is possible to use an up/down counter in conjunction with a direction detection algorithm to determine the region of operation. However, the device must start in a known angular region.

It is possible to calculate the number of output ramps generated by the ring magnet (i.e. number of distinguishable regions) using Equation 24 below with each ramp spanning an angular region given by Equation 25.

$$\text{Number\_of\_regions} = 2 \times (\text{Number\_of\_Pole\_Pairs}) \quad \text{Eq. (24)}$$

$$\theta_{RANGE} = \frac{360° \; MagnetRotation}{\text{Number\_of\_Regions}} \quad \text{Eq. (25)}$$

For example, using Equation 24 one can calculate that a ring magnet with two pole pairs corresponds to four output ramps over one complete rotation of the magnet. Each change in the bit state will correspond with a change in region of 90° (from Equation 25). The regions of operation could be distinguished as set forth in Table 1 below

TABLE 1

| Region of Operation | |
|---|---|
| Counter State | Region of Operation |
| 0 | 0-90° |
| 1 | 90°-180° |
| 2 | 180°-270° |
| 3 | 270°-360° |

Figure 15:
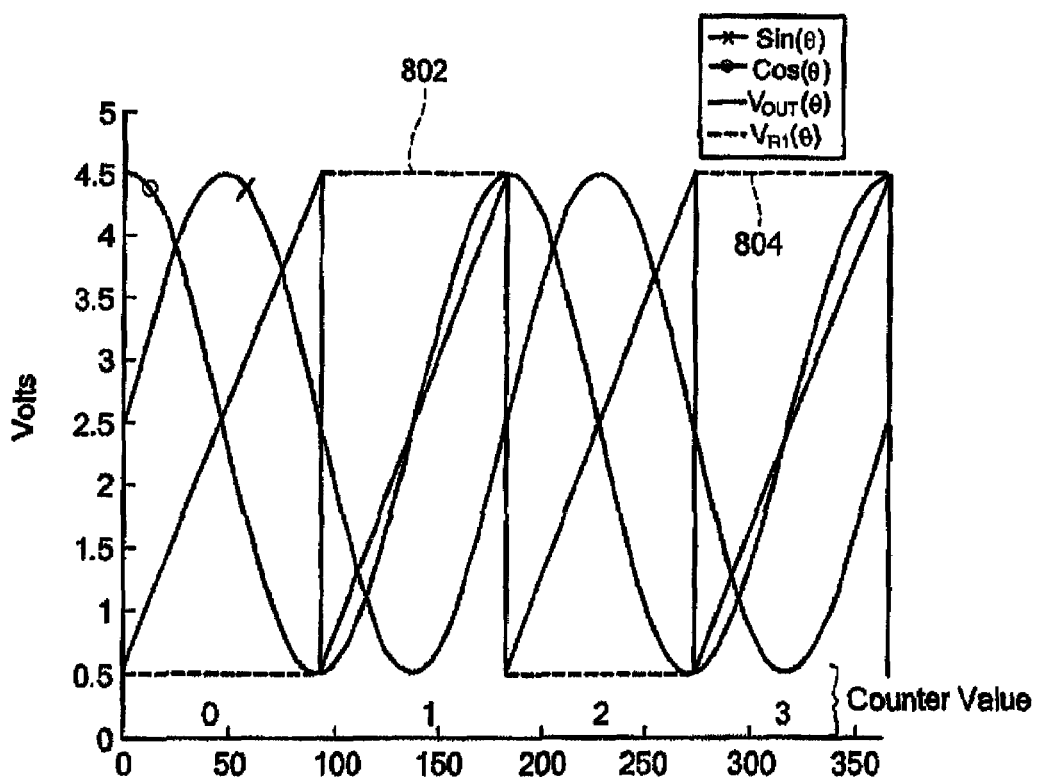
FIG. 15 is a graphical depiction of signals including ramps generated over one period of the sinusoidal signal.

As shown in FIG. 15, a region indicator bit distinguishes first and second ramps 802, 804 generated over one period of the sinusoidal signal. If the region indicator bit is sent as input into a counter, then the counter can be used to distinguish the four 90° regions of operation over a 360° rotation of the magnet.

While exemplary embodiments discuss the use of a Hall effect sensor, it would be apparent to one of ordinary skill in the art that other types of magnetic field sensors may also be used in place of or in combination with a Hall element. For example the device could use an anisotropic magnetoresistance (AMR) sensor and/or a Giant Magnetoresistance (GMR) sensor. In the case of GMR sensors, the GMR element is intended to cover the range of sensors comprised of multiple material stacks, for example: linear spin valves, a tunneling magnetoresistance (TMR), or a colossal magnetoresistance (CMR) sensor. In other embodiments, the sensor includes a back bias magnet to sense the rotation of a soft magnetic element, and/or target.

In another aspect of the invention, signal processing circuitry required to increase the frequency of sinusoidal signals that are created by rotating a single pole magnet over Hall elements processes the output voltage from the magnetic sensors and generates signals of greater frequency that can be used to obtain a better resolution when applied to an angle sensing algorithm, such as that described above in Equation 1.

As described above, a linear output from the sine and cosine inputs can be generated by rotating a single bipolar magnet over two individual Hall elements. With a linearized signal, a change in y-volts in the output directly corresponds to x degrees of rotation. In accordance with exemplary embodiments of the invention, increasing the frequency of the input sinusoids in turn increases the output resolution by increasing the number of linear output ramps over a period of 360°.

It is mathematically possible to increase the frequency of input sinusoids using the following trigonometric double angle identities:

$$\sin(2\theta) = 2\sin(\theta)\cos(\theta) \qquad \text{Eq. (26)}$$

$$\cos(2\theta) = \cos^2(\theta) - \sin^2(\theta) \qquad \text{Eq. (27)}$$

If the doubled frequency signals produced by Equations 26 and 27 are sent as inputs into the angle sensing mechanism of Equation 1, the output will have four linear ramps over a revolution of 360°. This doubling of linear ramps will result in a doubling of the overall resolution of the angle sensing.

The outputs are decoded to distinguish the four ramps between 0-90°, 90°-180°, 180°-270°, and 270°-360°. The decoding could be done using four bits, for example, as shown in Table 1, below.

TABLE 1

Decoder Bits To Distinguish the Region of Operation of Each of the Output Ramps

| Angular Region | Value of Decoder Bit 1 | Value of DecoderBit 2 |
|---|---|---|
| 0-90° | LOW | LOW |
| 90°-180° | LOW | HIGH |
| 180°-270° | HIGH | LOW |
| 270°-360° | HIGH | HIGH |

In an exemplary embodiment, decoder bit one can be generated as set forth below:

$$\sin(\theta + 22.5°) = \frac{\sqrt{2}}{4}\left((1+\sqrt{2})\sin(\theta) + \cos(\theta)\right)$$

if $\sin(\theta + 22.5°) >$ offset
  Bit 1 = LOW
else
  Bit 1 = HIGH where offset is the vertical offset of the sinusoidal signals with respect to mathematical zero (e.g. ground). Note that the complexity in determining decoder bit one is a result of the −45° phase shift in the output of the previous angle sensing relationship. It is possible to change the −45° phase shift, thus simplifying the comparison process, by using a different form of the algorithm than described in Equation 1.

To generate the signal for decoder bit two in Table 1 above, the following relationship can be utilized.

if $-\sin(2\theta) > \cos(2\theta)$
  Bit 2 = LOW
else
  Bit 2 = HIGH

Figure 16:
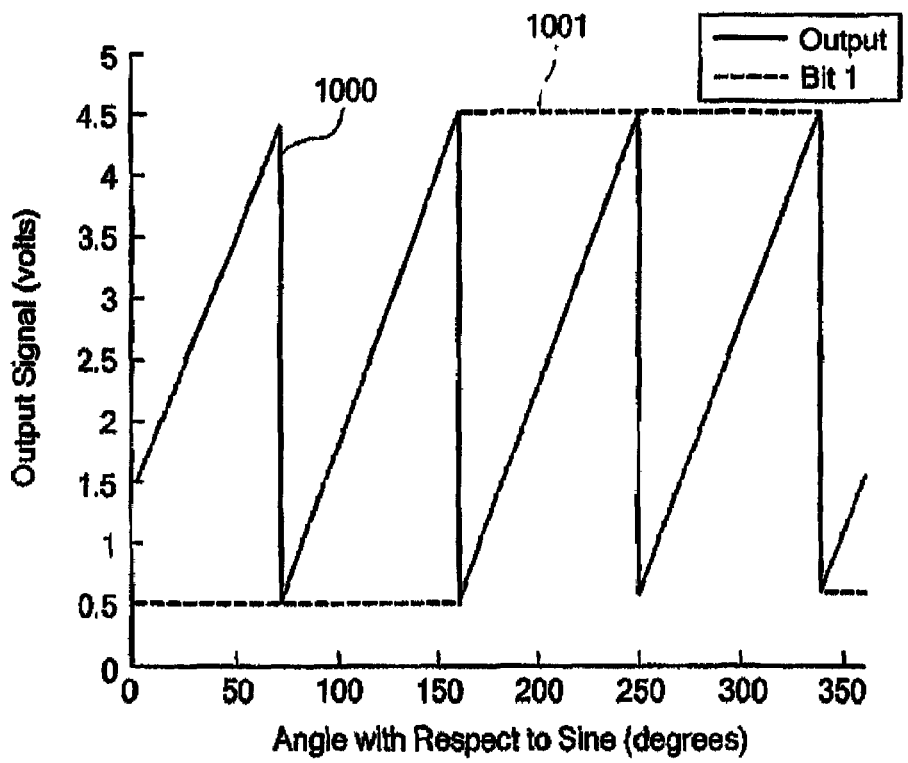
FIG. 16 is a graphical depiction of a first region decoder bit.
Figure 17:
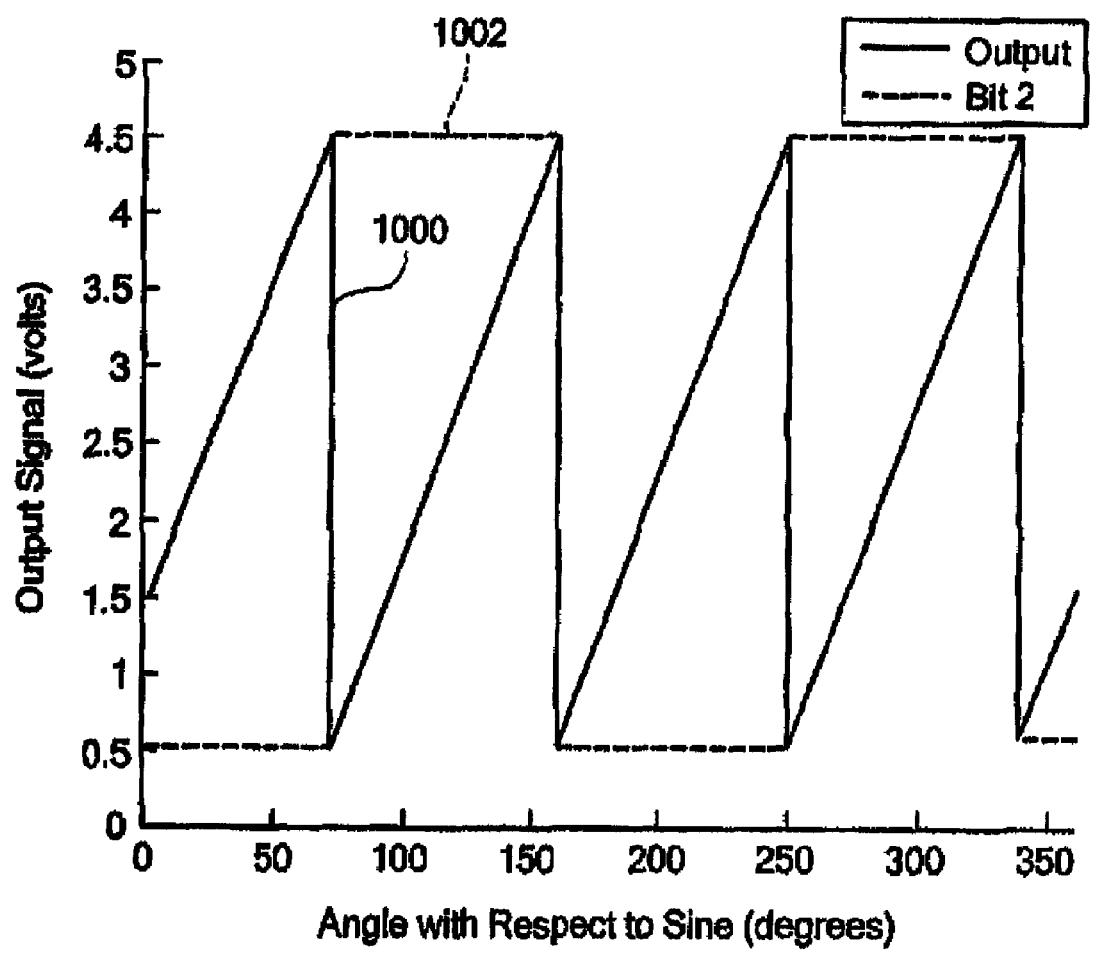
FIG. 17 is a graphical depiction of a second region decoder bit.

FIG. 16 shows a timing diagram with respect to the output 1000 for decoder bit one 1001 and FIG. 17 shows a timing diagram for decoder bit two 1002.

Figure 18:
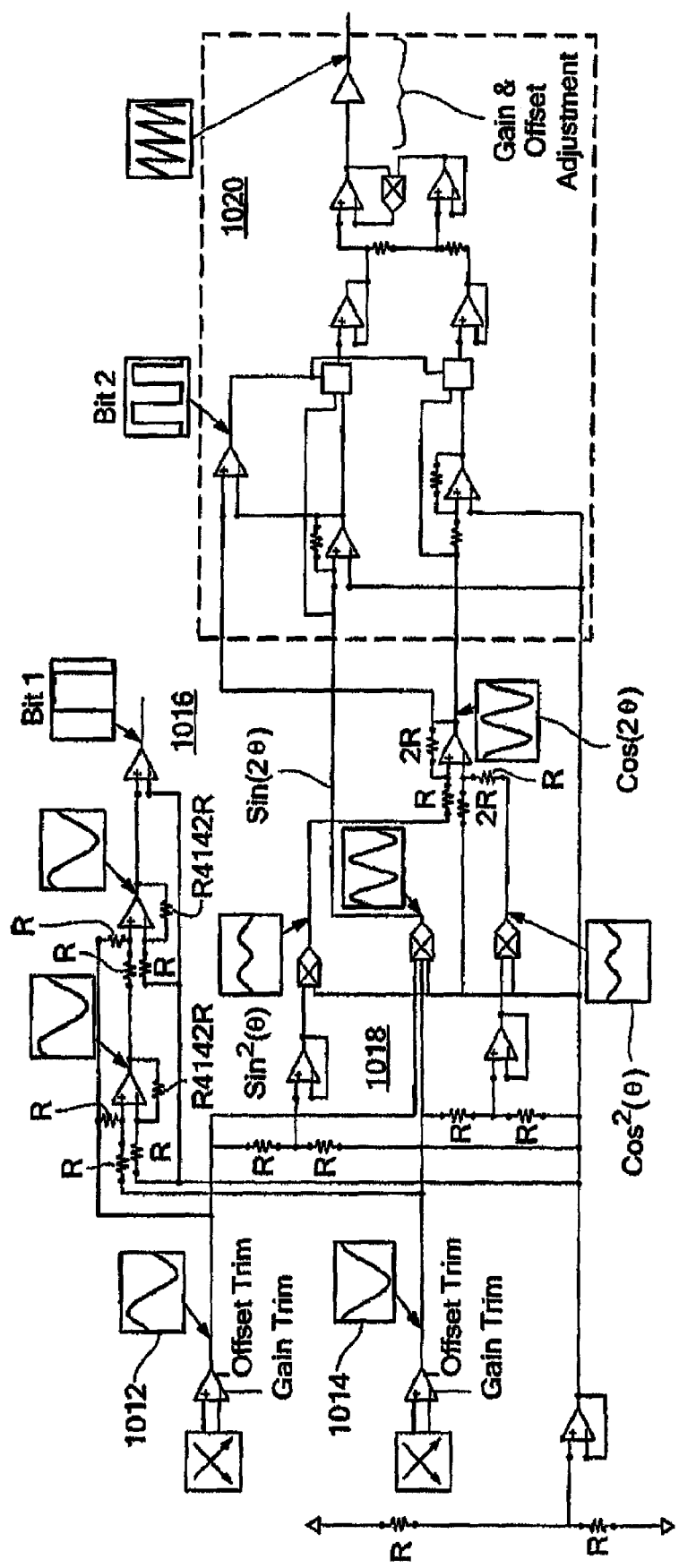
FIG. 18 is a circuit diagram of an exemplary implementation.

FIG. 18 shows an exemplary schematic implementation 1010 of the angle sensing mechanism described above. The circuit 1010 includes a sine input 1012 and a cosine input 1014. A region circuit 1016 generates the decoder bit one. A algebraic circuit 1018 implements equations 26 and 27 to provide $\sin(2\theta)$ and $\cos(2\theta)$ to an angle sensing circuit 1020, such as the circuit shown in FIG. 5. The algebraic circuit 1018 generates component signals $\sin(\theta)$ and $\cos(\theta)$, which are multiplied by two and $\cos^2(\theta)$ from which $\sin^2(\theta)$ is subtracted.

Figure 19:
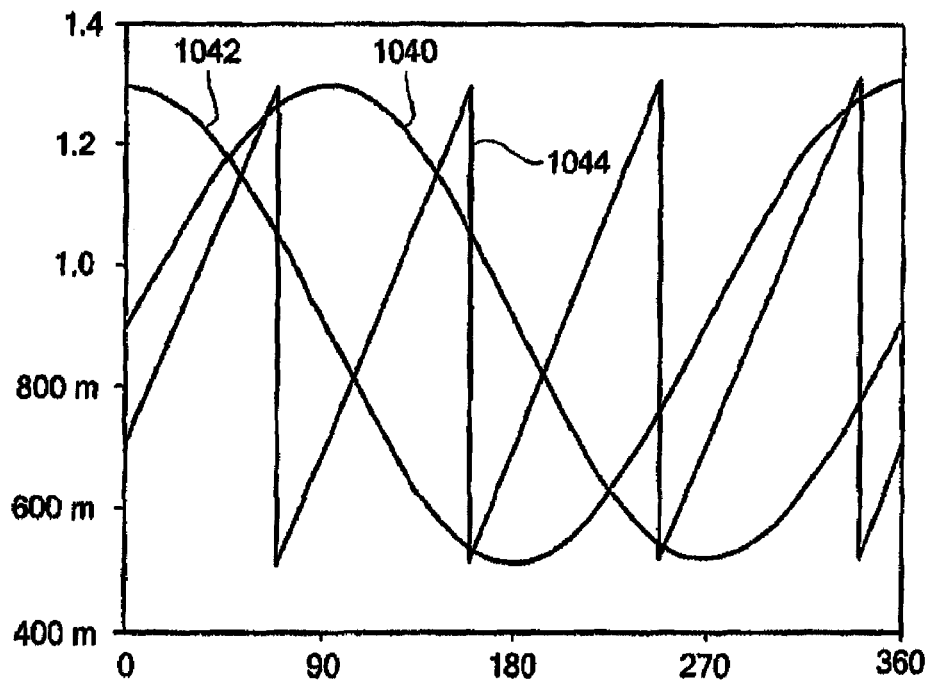
FIG. 19 is a graphical depiction of a simulation of the circuit of FIG. 18.

FIG. 19 shows a simulated output 1044 for the circuit of FIG. 18. The simulated input sine 1040 and cosine 1042 signals have frequencies of 1 kHz. Note that increasing the frequency to increase resolution can be achieved with any fraction of input signals. For example:

$$\sin\left(\frac{3}{2}\theta\right) = \sin\left(\theta + \frac{\theta}{2}\right) \qquad \text{Eq. (28)}$$

$$= \sin(\theta)\left(\pm\sqrt{\frac{1+\cos(\theta)}{2}}\right) +$$

$$\cos(\theta)\left(\pm\sqrt{\frac{1-\cos(\theta)}{2}}\right)$$

$$\cos\left(\frac{3}{2}\theta\right) = \cos\left(\theta + \frac{\theta}{2}\right) \qquad \text{Eq. (29)}$$

$$= \cos(\theta)\left(\pm\sqrt{\frac{1+\cos(\theta)}{2}}\right) +$$

$$\sin(\theta)\left(\pm\sqrt{\frac{1-\cos(\theta)}{2}}\right)$$

The number of linear ramps in the output is proportional to the frequency of the input; for the example using Equations 28 and 29 there would be three linear output ramps. Decoding circuitry can distinguish the region of operation for each of the linear ramps.

In a further aspect of the invention, an angle sensing output has a nonlinear waveform that can be complemented with a second signal so that an average of the two signals has an enhanced degree of linearity.

Equation 1 is copied below:

$$\text{output} = \frac{A\sin(\theta) + \text{offset}}{\frac{1}{k}(A\sin(\theta) + A\cos(\theta) + 2\,\text{offset})} \quad \text{Eq. (1)}$$

where output is the sensor output, A is the amplitude of the generated sine and cosine signals, offset is the vertical offset of the sinusoidal signals with respect to ground, and k is any real number. Where the waveforms are inverted in a region to achieve the same degree of linearity over 360 degrees (see Equation 4), the minus sign is applied if $-\sin(\theta) > \cos(\theta)$. Performing algebraic manipulations on Equation 1 reveals that it can be expressed in a simpler mathematical form without hindering its linearity properties set forth in Equation 30 below.

$$\text{output} = \frac{A\sin(\theta)}{A\cos(\theta) \pm \text{offset}} \quad \text{Eq. (30)}$$

where output is the sensor output, A is the amplitude of the generated sine and cosine signals, and offset is the vertical offset of cosine with respect to ground. The minus sign is applied if $\cos(\theta) < 0$. Recall that the output of Equations 1 and 30 is not truly linear, but has a theoretical best-case maximum error of ±0.33 degrees assuming that one period of the input sinusoids corresponds with one 360 degree revolution of a magnet.

One can choose a value for the value of the offset in Equation 30 that generates a nonlinear waveform. It is possible to then generate a second waveform with complimentary nonlinearity to the first. In one embodiment, this is performed by using a slightly modified version of Equation 30 as shown in Equation 31 below. The average of the first and second waveforms can have a higher degree of linearity than the best-case error of Equation 30 alone.

Figure 20:
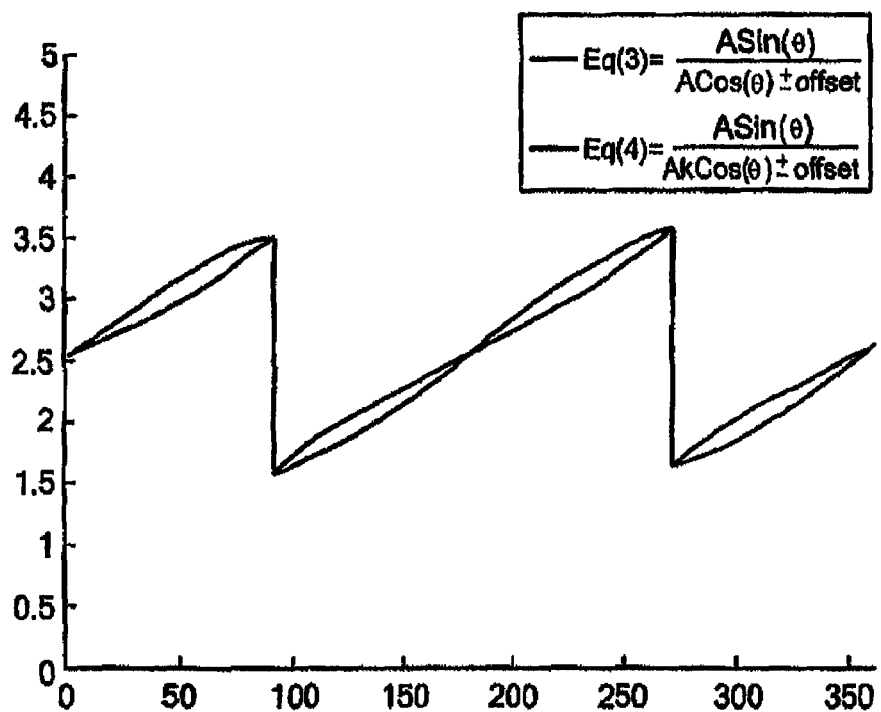
FIG. 20 is a graphical depiction of complementary waveform averaging.

Consider Equation 30 above and Equation 31 below:

$$\text{output} = \frac{A\sin(\theta)}{Ak\cos(\theta) \pm \text{offset}} \quad \text{Eq. (31)}$$

where k is a scaling factor. Note that A and offset have the same value for both equations. Choosing the values of k=0.309 and offset=1.02A produce the waveforms shown in FIG. 20. The output 1100 of Equation 30 and the output 1102 of Equation 31 show that their respective nonlinearities compliment each other so that the average of the two waveforms has a higher degree of linearity. The resulting output has a best-case maximum error of 0.029 degrees for the values of offset and k chosen above.

Averaging the waveforms 1100, 1102 results in an output with a best-case maximum error of 0.029°. This is an order of magnitude less than without the inventive complementary waveform averaging.

Figure 21:
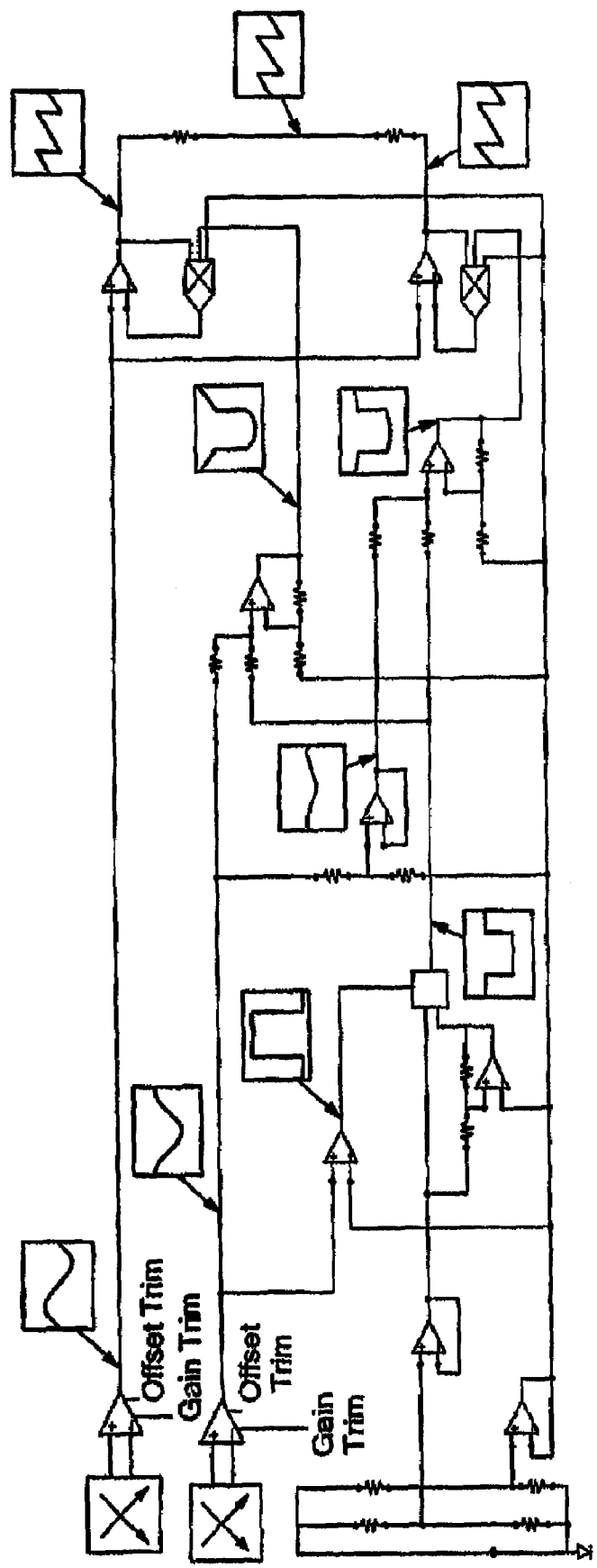
FIG. 21 is a circuit diagram of an exemplary implementation of waveform averaging.

The final output is described by Equation 32 below:

$$\text{output} = \frac{1}{2}\left(\frac{A\sin(\theta)}{A\cos(\theta) \pm \text{offset}} + \frac{A\sin(\theta)}{Ak\cos(\theta) \pm \text{offset}}\right) \quad \text{Eq. 32}$$

where A is the amplitude of sine and cosine, offset is the offset of cosine, and k is a scaling factor. Inversion is applied (i.e., minus sign) when $\cos(\theta) < 0$. FIG. 21 below shows an exemplary implementation of Equation 32 in circuitry.

Note that the same averaging technique described here could be performed on two waveforms generated by Equation 30 that have different offsets, as shown in Equation 33.

$$\text{output} = \frac{1}{2}\left(\frac{A\sin(\theta)}{A\cos(\theta) \pm \textit{offset1}} + \frac{A\sin(\theta)}{Ak\cos(\theta) \pm \textit{offset2}}\right) \quad \text{Eq. (33)}$$

For example if offset1=1.36 and offset2=4.76, then the output of Equation 33 would have an error of about ±0.15°.

In another aspect of the invention, a circuit integrates two magnetic sensors and the signal processing circuitry required to generate a third sinusoidal signal that is derived from the two sensor outputs. Using the three signals, the phase difference between two of the sinusoidal signals is trimmed. Trimming the phase difference between two sinusoidal signals can be advantageous in angle sensing, gear tooth sensing, and other applications. This feature is particularly advantageous when trimming out sensor misalignments as a result of:

Manufacturing placement tolerances during final sensor installation (i.e., misalignment of a disk magnet relative to an angle sensor)

Manufacturing placement tolerances that affect the relative placement of two Hall or MR sensors that do not reside on a single substrate. This would be advantageous in the case where a silicon signal processing die is interfaced with two or more GaAs Hall plates or MR (magnetoresistive sensors).

The conventional approach for generating a pair of sine/cosine signals required for angle sensing applications is to place two Hall plates at a 90° mechanical offset around the center of a rotating magnet. A disadvantage of this approach is that any misalignment in the 90° mechanical offset of the Hall plates results in a phase error between the sin and cosine signals. The primary source of mechanical misalignment comes from the end user's inability to precisely align the magnet above the device package. For example, a magnet placement misalignment of five mils can result in a phase error of up to about ±8.33°. Such a phase error translates to an angular error of approximately ±8° for arc tangent algorithms. Phase error is one of the leading sources of error in angle sensing algorithms.

In accordance with exemplary embodiments of the invention, the phase difference between a Hall/MR generated sine/cosine signal pair is trimmed, as described in detail below. Note that this trimming may be difficult to implement when $\cos(\theta)$ is constructed using ninety degree offset sensors.

The relationships in Equations 34, 35 and 36 can be exploited to providing trimming in accordance with exemplary embodiments of the invention.

$$C\sin(\theta + \gamma) = A\sin(\theta + \alpha) + B\sin(\theta + \beta) \quad \text{Eq. (34)}$$

$$C = \sqrt{A^2 + B^2 + 2AB\cos(\alpha + \beta)} \quad \text{Eq. (35)}$$

$$\gamma = \arccos\left(\frac{A\cos(\alpha) + B\cos(\beta)}{C}\right)\text{sgn}\left(\frac{A\sin(\alpha) + B\sin(\beta)}{C}\right) \quad \text{Eq. (36)}$$

where A, B and C are the gains of their respective sinusoids, and α, β, γ are their phases. An exemplary technique for constructing cos(θ) is described in the below.

Figure 22:
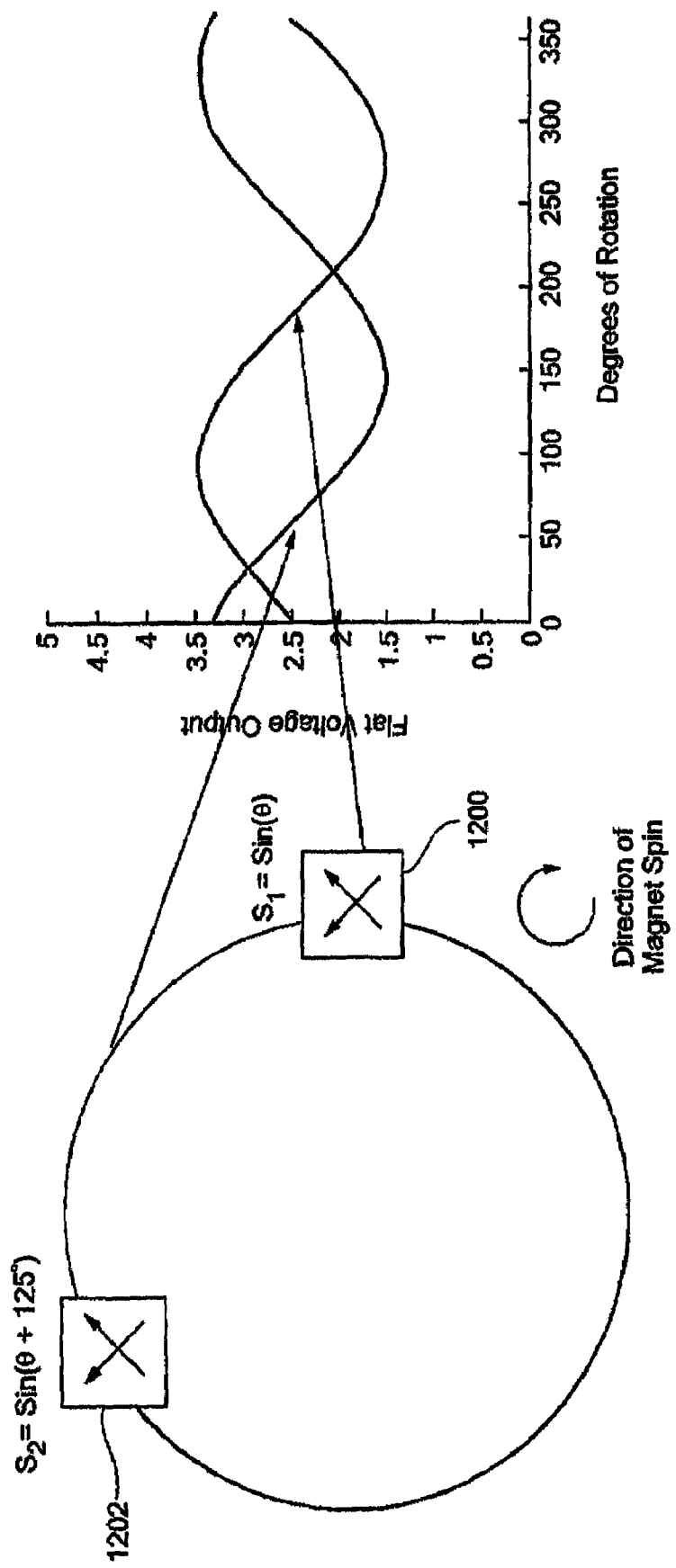
FIG. 22 is a pictorial representation of two offset Hall elements and generated signals.

As shown in FIG. 22, initially first and second Hall signals $S_1$ and $S_2$ are generated by respective Hall elements 1200, 1202. Let $S_1$=A sin(θ), where A is some arbitrary gain. Note that it is assumed that A sin(θ) is a reference signal and therefore it has no phase error associated with it. Let $S_2$=A sin(θ+β) where 90°<β<180°. For example, if A=1 and β=125°, then $S_1$=sin(θ) and $S_2$=sin(θ+125°). Generate $S_2$ by placing the second Hall at a mechanical phase offset with respect to $S_1$.

The two generated signals can be related to cosine using Equations 37, 38, and 39 below.

$$C\cos(\theta) = A\sin(\theta) + GA\sin(\theta + \beta) \quad \text{Eq. (37)}$$

$$G = -\frac{1}{\cos(\beta)} \quad \text{Eq. (38)}$$

$$C = A\sqrt{\frac{1}{\cos^2(\beta)} - 1} \quad \text{Eq. (39)}$$

where G is a gain factor and C is the amplitude of the resulting cosine signal.

Figure 23:
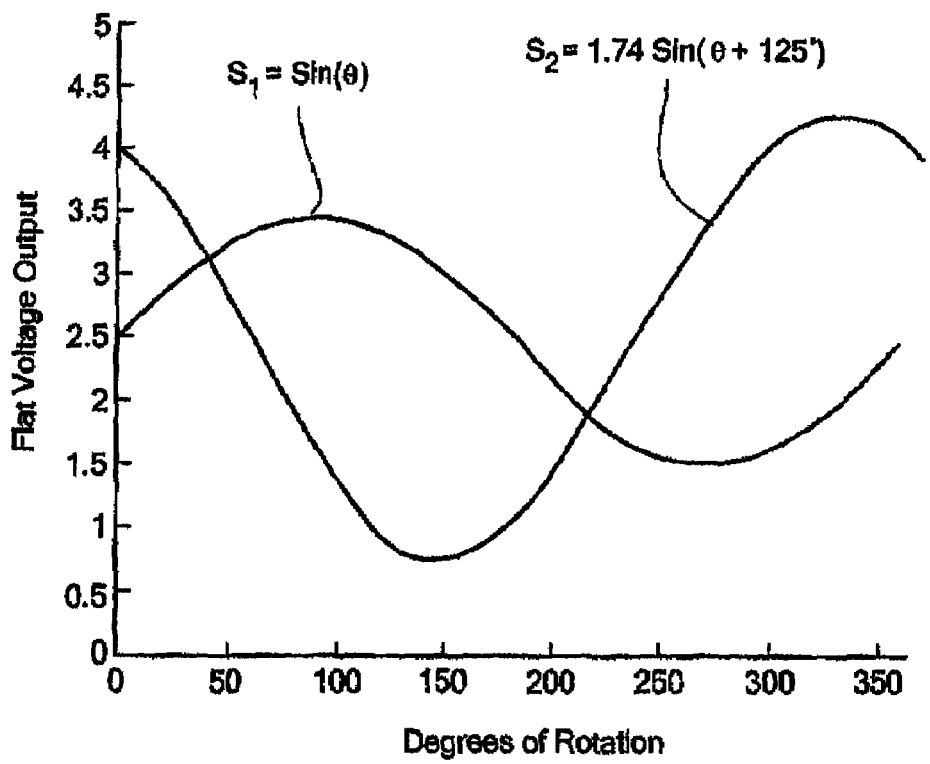
FIG. 23 is a graphical depiction of a first signal processing step.

The second signal $S_2$ can be gained by G. Where β=125°, one can calculate (Equation 38) that G=1.74. As a result, $S_2$=1.74 sin(θ+125°), as shown in FIG. 23.

Figure 24:
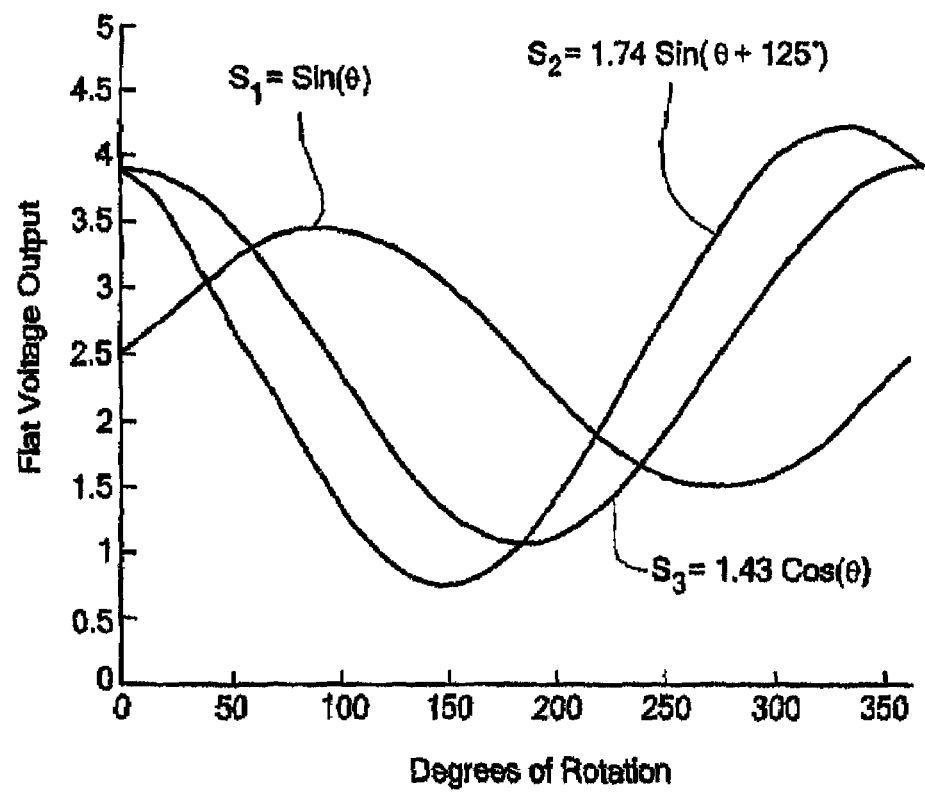
FIG. 24 is a graphical depiction of a second signal processing step.

Now let $S_3 = S_1 + S_2$. As Equation 37 dictates, $S_3$=C cos(θ), where C can be calculated using Equation 39. In the example, C=1.43, so $S_3$=1.43 cos(θ), as shown in FIG. 24 where A sin(θ) and Ga sin(Γ+β) are added to get C cos(θ).

Figure 25:
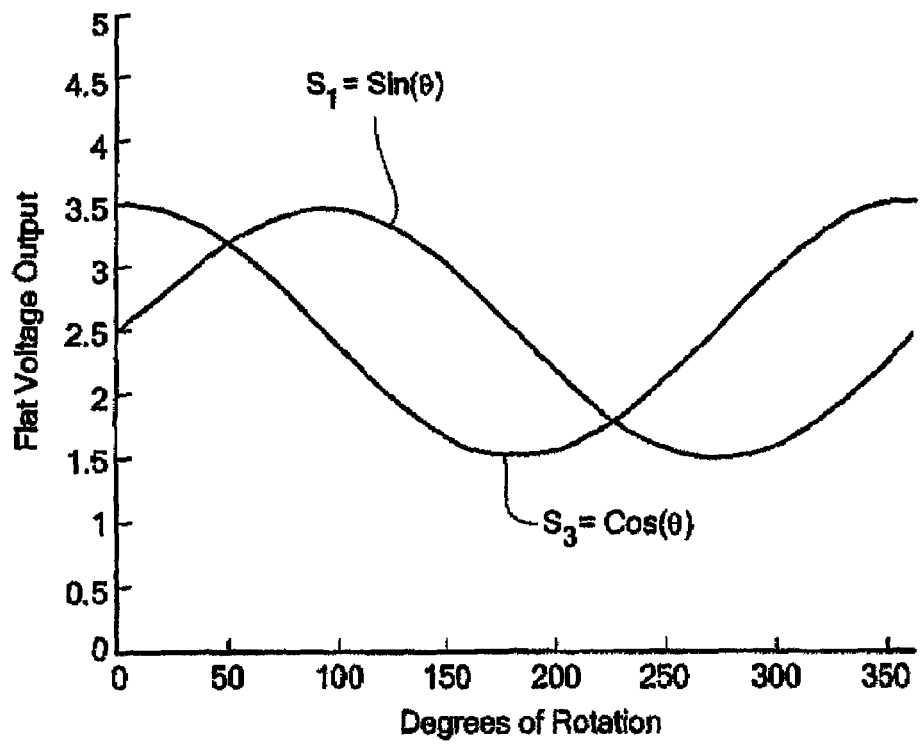
FIG. 25 is a graphical depiction of a third signal processing step.

The third signal $S_3$ is then attenuated so that its amplitude matches that of the first signal $S_1$. This produce $S_1$=sin(θ) and $S_3$=cos(θ), as shown in FIG. 25.

After constructing the phase-shifted cosine signal as above, the phase of the cosine can be trimmed. Cosine was constructed by adding the signals generated from rotating a magnet over two mechanically offset Hall elements. Assume that $S_1$ (which equals A sin(θ)) has no phase error associated with it because it is a reference signal. The phase of $S_3$ is determined by both the phase β of $S_2$ and the gain factor G of $S_2$. $S_3$=C sin(θ+γ) where γ is given in Equation 40 below.

$$\gamma = \arccos\left(\frac{1 + G\cos(\beta)}{\sqrt{G^2 + 2G\cos(\beta) + 1}}\right) \quad \text{Eq. (40)}$$

Ideally γ is equal to 90° since C sin(θ+90°)=C cos(θ).

It is known that $S_2$ might have a phase error due to magnet misalignment, and its phase error will directly affect the phase of $S_3$. However, it is possible to trim out error in the phase of $S_3$ by adjusting the gain of $S_2$, as shown in the example below.

EXAMPLE

Assume that it is expected to generate the following signals:

$S_1$=sin(θ)

$S_2$=G sin(θ+125°)=1.74 sin(θ+125°)

$S_3$=C sin(θ+90°)=1.43 sin(θ+90°)=1.43 cos(θ)

But due to magnet misalignment the following results:

$S_1$=sin(θ)

$S_2$=1.74 sin(θ+115°)

$S_3$=2.14 sin(θ+80.54°)

The phase of $S_3$ can be 'fixed' by changing the gain of $S_2$. Instead of having G=1.74, let G=2.37. This will make $S_2$=2.37 sin(θ+115°) and $S_3$=2.14 sin(θ+90°).

Figure 26:
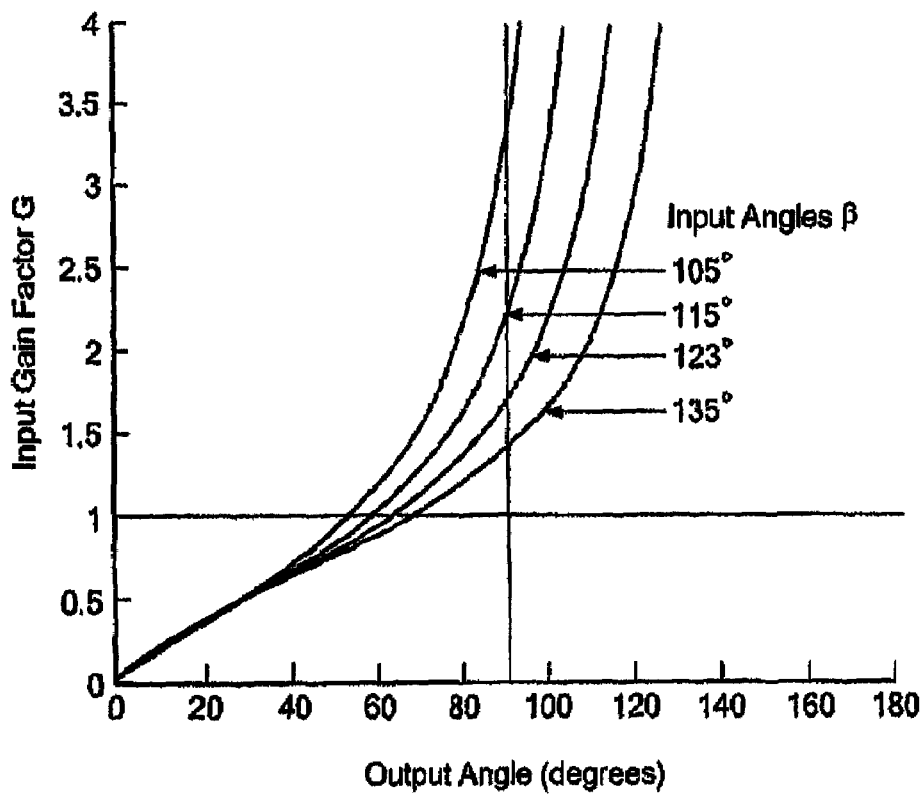
FIG. 26 is a graphical depiction showing input gain factor, input angle and output angle.

FIG. 26 shows how the gain factor G affects the output phase γ, for a few choices of β, which is the mechanical offset of $S_2$ with respect to $S_1$. The steeper the output curve is around 90°, the easier it is to fine tune γ via changing the gain factor G. In other words, for steeper curves around 90°, gain error has less impact on the final output angle. This is calculated in Table I, below, which summarizes the effect of the input phase β on the ability to construct a 90° phase shifted signal.

TABLE I

As the input phase β decreases, the angle resolution increases. The angle resolution is calculated assuming that the gain factor G can be achieved to within ±1%.

| Actual Phase β of Sensors | Ideal Value of Gain Factor G | Calculated Value of Output Gain C | Phase Error from Ideal 90° |
|---|---|---|---|
| 95° | 11.474 | 11.430 A | ±0.06° |
| 105° | 3.864 | 3.732 A | ±0.16° |
| 115° | 2.366 | 2.145 A | ±0.28° |
| 125° | 1.743 | 1.428 A | ±0.44° |
| 135° | 1.414 | A | ±0.59° |
| 145° | 1.221 | 0.700 A | ±0.83° |
| 155° | 1.103 | 0.466 A | ±1.29° |

Figure 27:
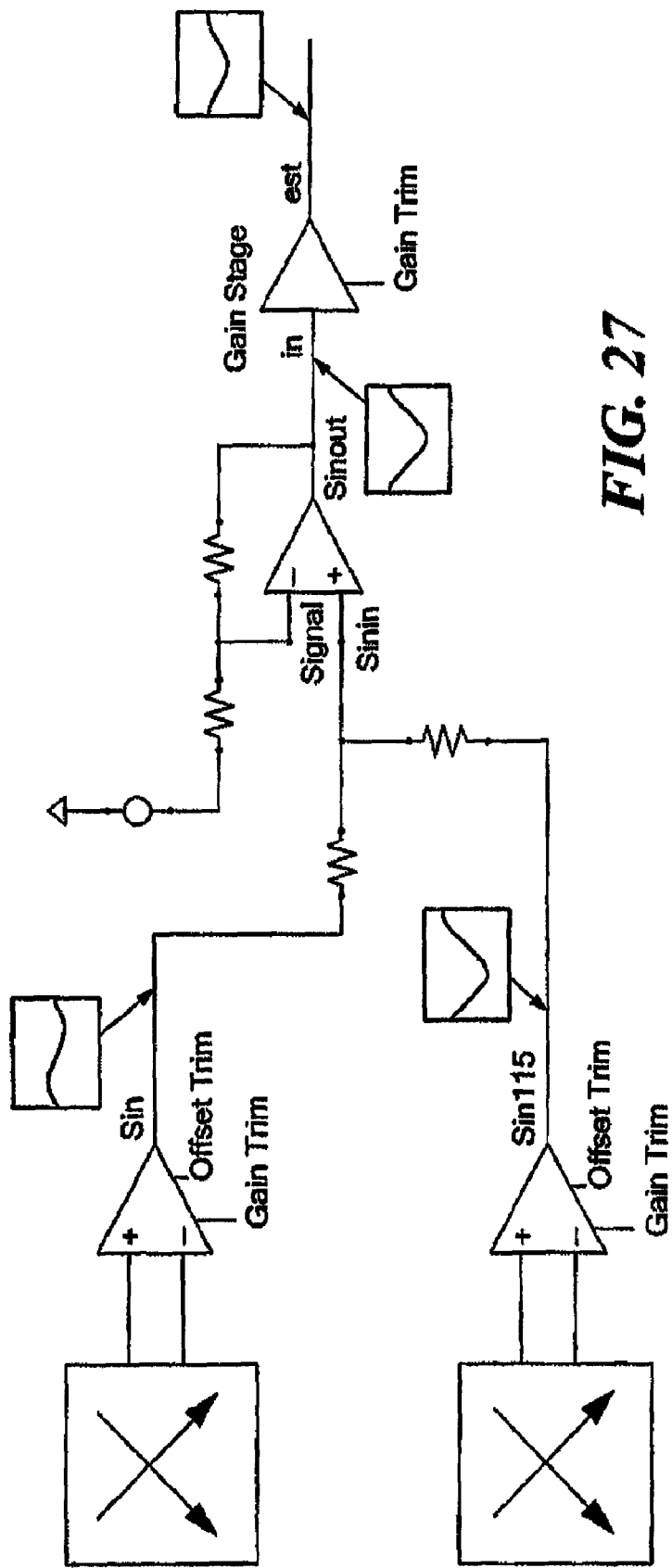
FIG. 27 is a circuit diagram showing an exemplary implementation.

In a practical application, perhaps the best choice for β is 115°. The worst-case accuracy of the phase of cosine would be ±0.44° assuming that β<±10°. The next step is to regulate the gain of C so that it matches A. This mathematical process of constructing cosine is implemented in exemplary circuitry in FIG. 27. A cosine signal is generated from two input Hall signals A sin(θ) and AG sin(θ+β). To adjust for phase misalignment in β, the gain stage should be regulated. This example assumes that A=0.5 V, G=2.366 and β=115°.

The same technique used to trim the phase of cosine can be applied to trimming the phase of sine. More particularly, rearranging Equation 39 produces the result in Equation 41:

$S_1 = S_3 - S_2$ or, $$A \sin(\theta) = C \cos(\theta) - GA \sin(\theta + \beta) \quad \text{Eq. (41)}$$

Figure 28:
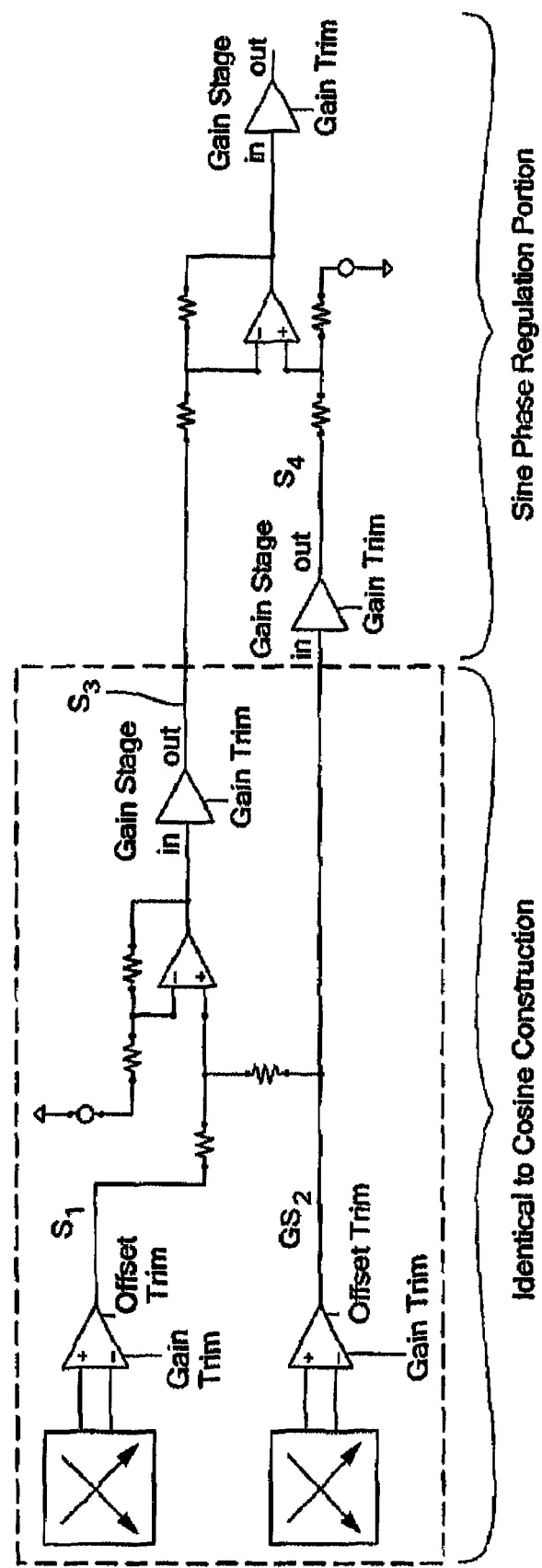
FIG. 28 is a circuit diagram showing further exemplary implementation of the circuit of FIG. 27.

To phase shift A sin(θ) one can add another gain stage to the output of $S_2$ and then apply Equation 41. Consider the following:

$S_4 = X\, S_2$ $$YA \sin(\theta + \alpha) = C \cos(\theta) - XGA \sin(\theta + \beta) \quad \text{Eq. (42)}$$

where X and Y are gain factors and α is the angle shifted. These variables can be calculated using the same principles found above for the cosine. FIG. 28 shows how the phase regulation of A sin(θ) can be added to the cosine construction circuitry of FIG. 27

In another aspect of the invention, a single waveform, which can be sinusoidal, is used to generate a corresponding cosine signal. As is known in the art, one obstacle in developing an angle sensing circuit is linearizing the sinusoidal inputs without relying on the memory of a previous state. As described above, a linear output can be provided from two sinusoidal inputs, e.g., sine and cosine signals are generated from rotating a single pole magnet over two spatially phase shifted Hall elements. In exemplary embodiments of the invention, trigonometric identities are applied to a single sinusoidal input in order to construct its corresponding cosine signal. In one embodiment, a triangle wave is generated that corresponds to the input sinusoid. The generation of this triangle wave does not require any memory of a previous state.

Taking advantage of the trigonometric identity $\sin^2(\theta) + \cos^2(\theta) = 1$, which can be written as in Equation 42:

$$A^2\sin^2(\theta) + A^2\cos^2(\theta) = A^2 \qquad \text{Eq. (42)}$$

where A is a gain factor and $\theta$ is angular position, one solve for the absolute value of $\cos(\theta)$. Rearranging Equation 42 produces the result in Equation 43:

$$|A\cos(\theta)| = +\sqrt{A^2 - A^2\sin^2(\theta)} \qquad \text{Eq. (43)}$$

which provides rectified $\cos(\theta)$. A true $\cos(\theta)$ signal cannot be calculated directly because the squaring terms in this identity make all values positive. To calculate true $\cos(\theta)$ requires an indicator bit that will invert the rectified signal at the appropriate points.

Figure 29:
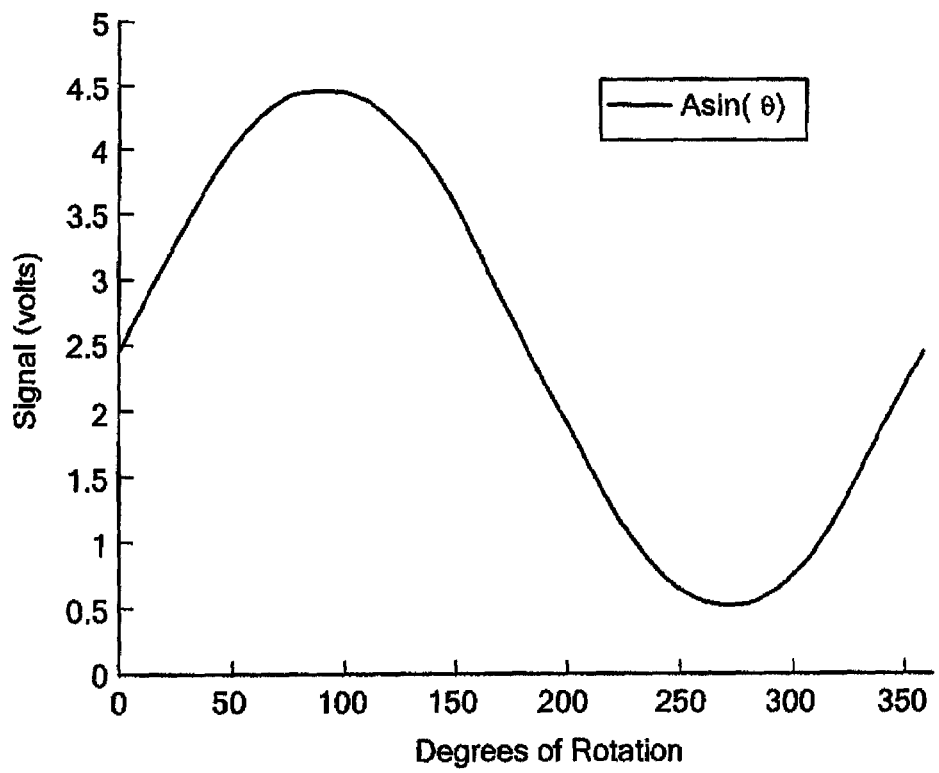
FIG. 29 is a graphical depiction of a first signal processing step.
Figure 30:
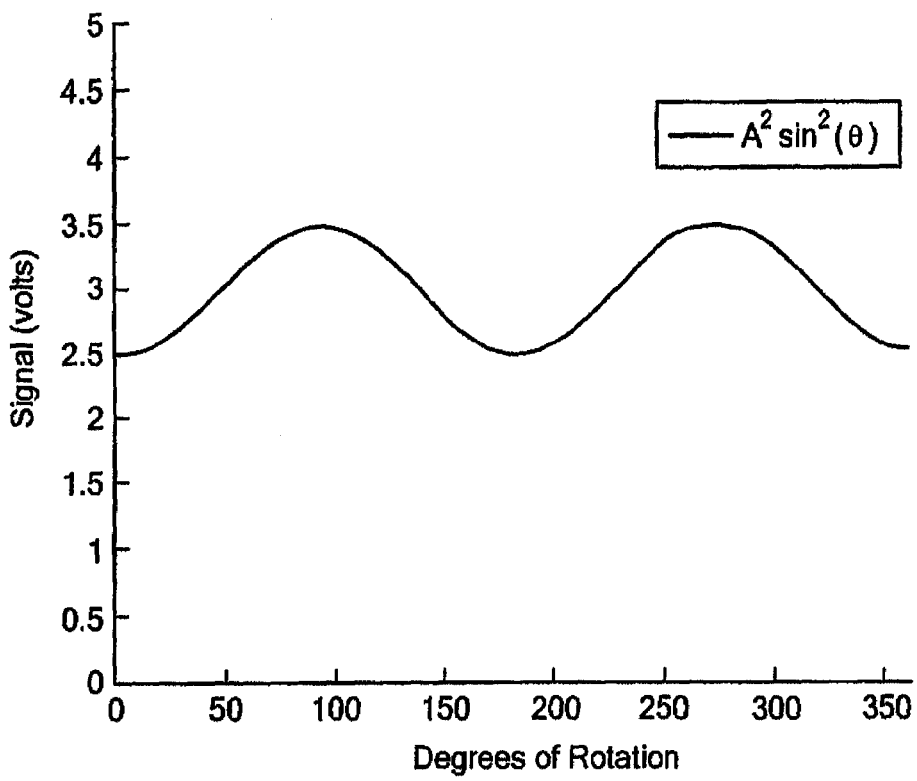
FIG. 30 is a graphical depiction of a second signal processing step.
Figure 31:
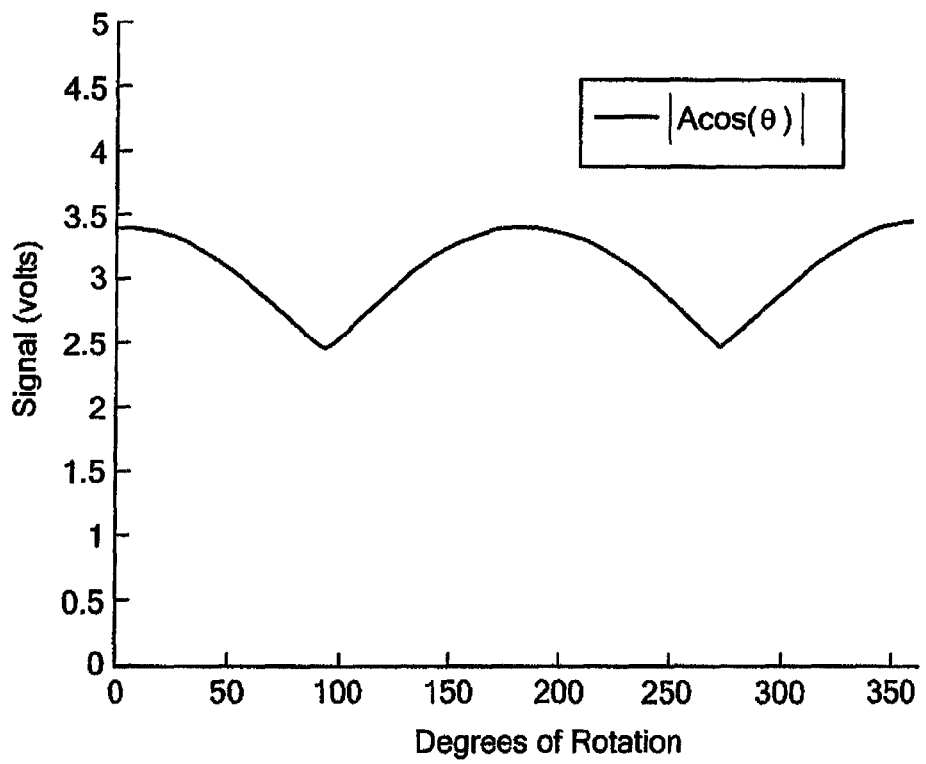
FIG. 31 is a graphical depiction of a third signal processing step.
Figure 32:
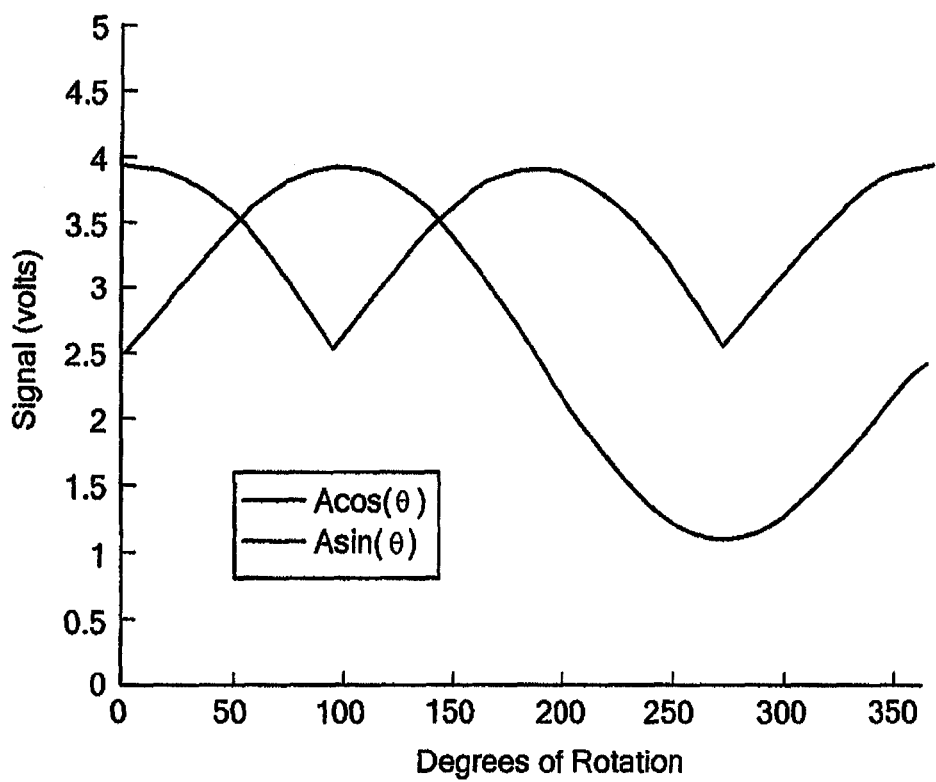
FIG. 32 is a graphical depiction of a fourth signal processing step.

As shown above, a linear output can be calculated using a rectified sinusoidal signal. A sinusoidal input can be linearized by constructing its corresponding cosine signal. Initially, a sinusoidal input $A\sin(\theta)$ is provided, as shown in FIG. 29. The sinusoid is manipulated, as shown in FIG. 30, to have the form $A^2\sin^2(\theta)$. Then $|A\cos(\theta)|$ can be calculated as shown in FIG. 31. The next step gains $A\sin(\theta)$ and $|A\cos(\theta)|$ by a constant, G to adhere to rules in Equations 44 and 45.

Figure 33:
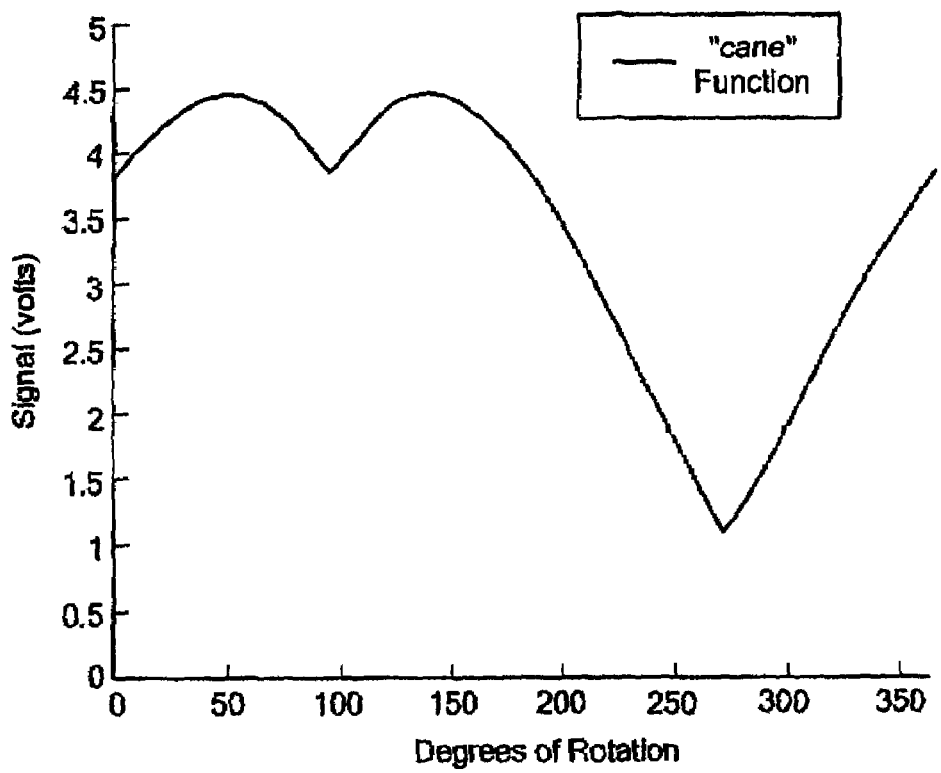
FIG. 33 is a graphical depiction of a fifth signal processing step.
Figure 34:
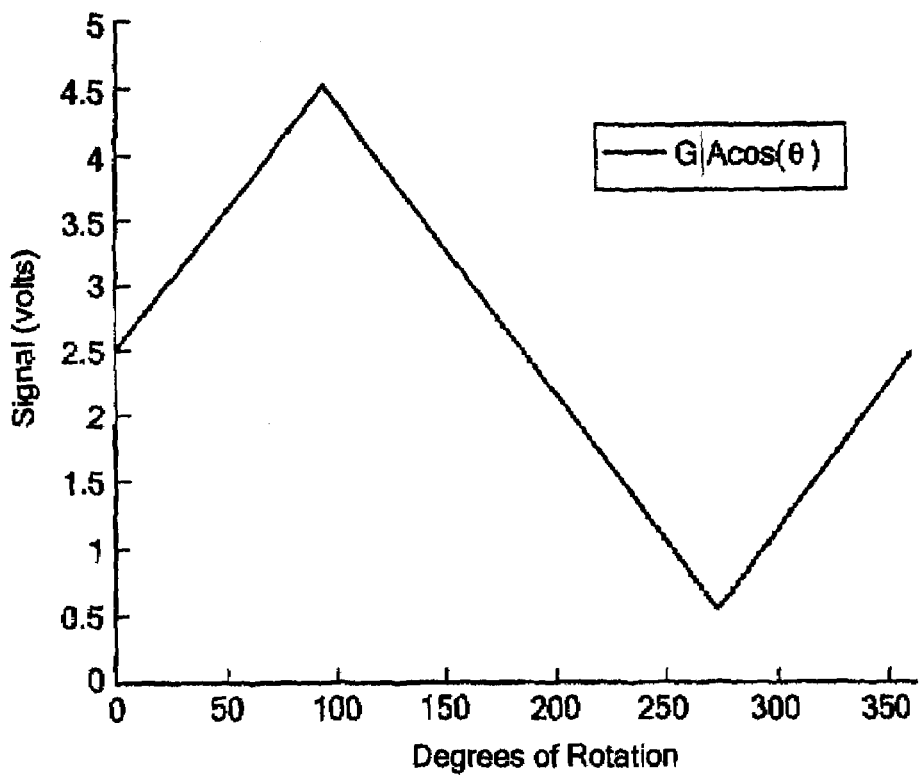
FIG. 34 is a graphical depiction of a sixth signal processing step.

An inverted "cane" waveform, shown in FIG. 33, is generated by adding $GA\sin(\theta)$ to $G|A\cos(\theta)|$. The cane waveform will be larger than the $GA\sin(\theta)$ and $G|A\cos(\theta)|$ by a factor of $\sqrt{2}$ by virtue of the addition operation. As shown in FIG. 34, the "cane" waveform can be divided by the rectified $G|A\cos(q)|$ the output of which can be trimmed in output gain and offset accordingly. The output waveform corresponds with the peaks and troughs of the originating sinusoid.

Figure 35:
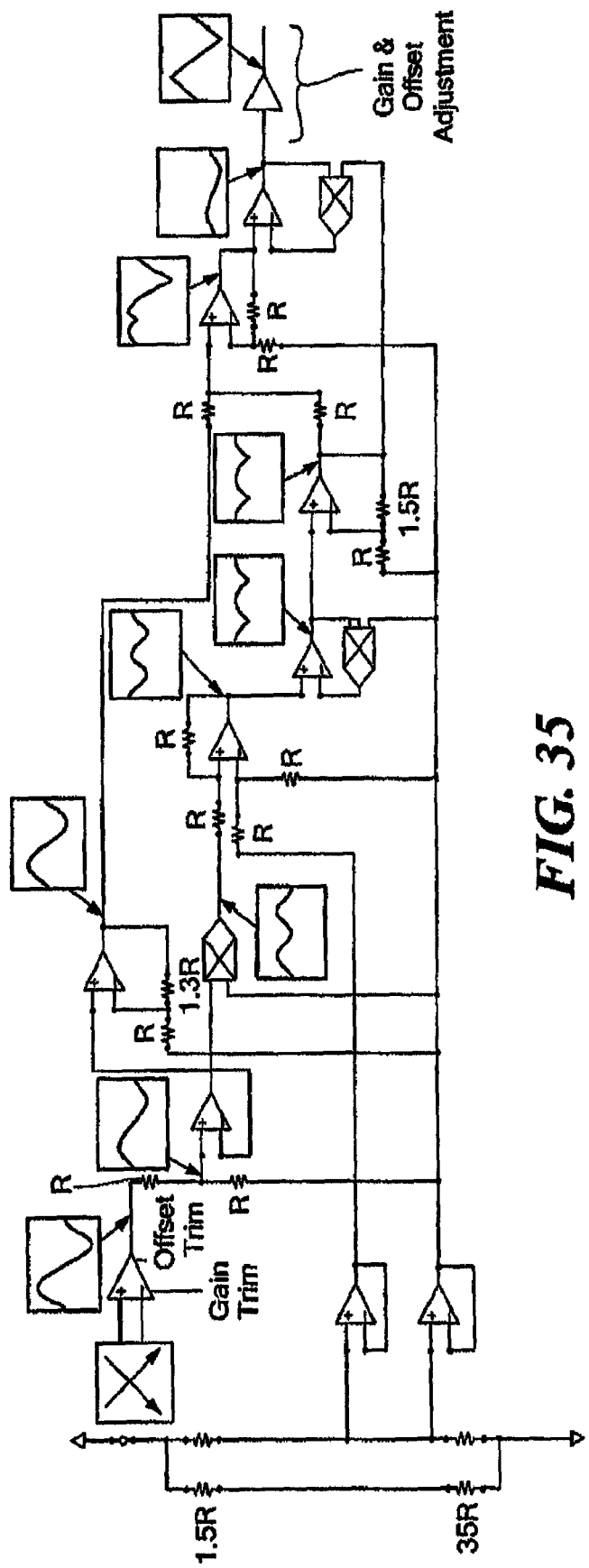
FIG. 35 is a circuit diagram of an exemplary implementation.
Figure 36:
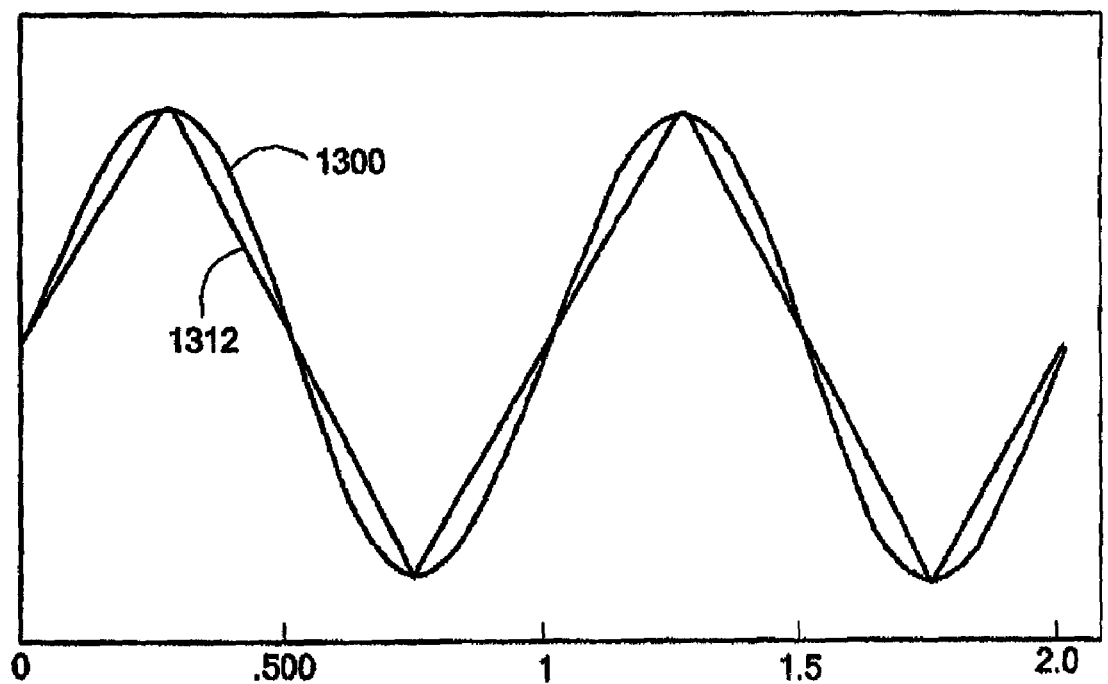
FIG. 36 is a graphical depiction of a simulated output for the circuit of FIG. 35.

For optimal results in an exemplary embodiment, the relationships in Equations 44 and 45 should be true:

$$GA = 0.596 \text{ (offset)} \qquad \text{Eq. (44)}$$

$$\text{offset} \neq 0 \qquad \text{Eq. (45)}$$

where G is the gain factor described above and offset is the vertical offset of the sinusoidal signals with respect to mathematical zero (e.g. ground). In an ideal case where there are no error sources, the minimum nonlinearity is 0.328°. This procedure for linearizing a sinusoid can be implemented in circuitry, such as the exemplary circuit shown in FIG. 35. The output of the circuit is shown in the simulated results of FIG. 36 for the input sinusoid 1300 and the triangular output 1302. For this example the input sinusoid has a frequency of 1 kHz.

To utilize this algorithm in a 360 degree angle sensing application a method of identifying the negatively sloped portion of the output is required. However, this would not be required for a 180 degree sensor. This identification can be in the form of an indicator bit that will invert the negatively sloped portion and distinguish the 0-180° region from the 180°-360° region. This indicator bit may take the form of an additional magnetic field sensor that is used to identify the polarity of the magnetic field, i.e., north or south. Without this indicator bit the algorithm would only be capable of a range of 0-180°. Notice that the output differs from the mechanism of Equation 1 in that the phase of the output has a −90° phase shift rather than a −45° phase shift. The phase shift for an embodiment of Equation 1 considered 0° to be the point where the output was at a minimum.

In another aspect of the invention, the gain and offset of the input sinusoids is controlled in order to reduce the final output error. Automatic Gain Control (AGC) and Automatic Offset Adjust (AOA) can be applied to the angle sensing embodiments described above. For example, one embodiment uses offset adjustment DACs (digital-to-analog) and gain cell transconductors that accept an input current from a current DAC to control the gain of an amplifier. U.S. Pat. Nos. 7,026,808, 6,919,720, and 6,815,944, which are incorporated herein by reference shows exemplary AGC circuits, and U.S. patent application Ser. No. 11/405,265, filed on Apr. 17, 2006, which are incorporated herein by reference, disclose exemplary AOA embodiments.

In another embodiment, a circuit having gain control relies on the fact that the inputs are $A_1\sin(\theta)$ and $A_2\cos(\theta)$, where $A_1$ and $A_2$ are the gain values of the signals. If one assumes the signals have matching gains, (i.e. $A_1 = A_2 = A$) one can implement into circuitry the trigonometric identity $A = \sqrt{(A\sin(\theta))^2 + (A\cos(\theta))^2}$ to solve for the actual gain, A. Scaling the sinusoids by some factor of A (where A is calculated using the equation above) will result in a final constant gain regardless of variations due to air gap displacement. This method of gain control is effective for signals with zero offset and matching gains, and it can be used in conjunction with other AGC methods.

It is understood that gain and offset can be trimmed at end of line test and/or at customer final test, for example. It can also be adjusted at device power up or change dynamically during running mode.

If dynamic adjustment of gain and offset is desired during operation the device can have a calibrate pin that enables or disables the adjust mode. This pin could also control the update speed in which the AGC and AOA corrections are applied to the output. The update frequency could be controlled by a timing mechanism or correspond with the falling edge transition of the algorithm's final output ramp.

Figure 37:
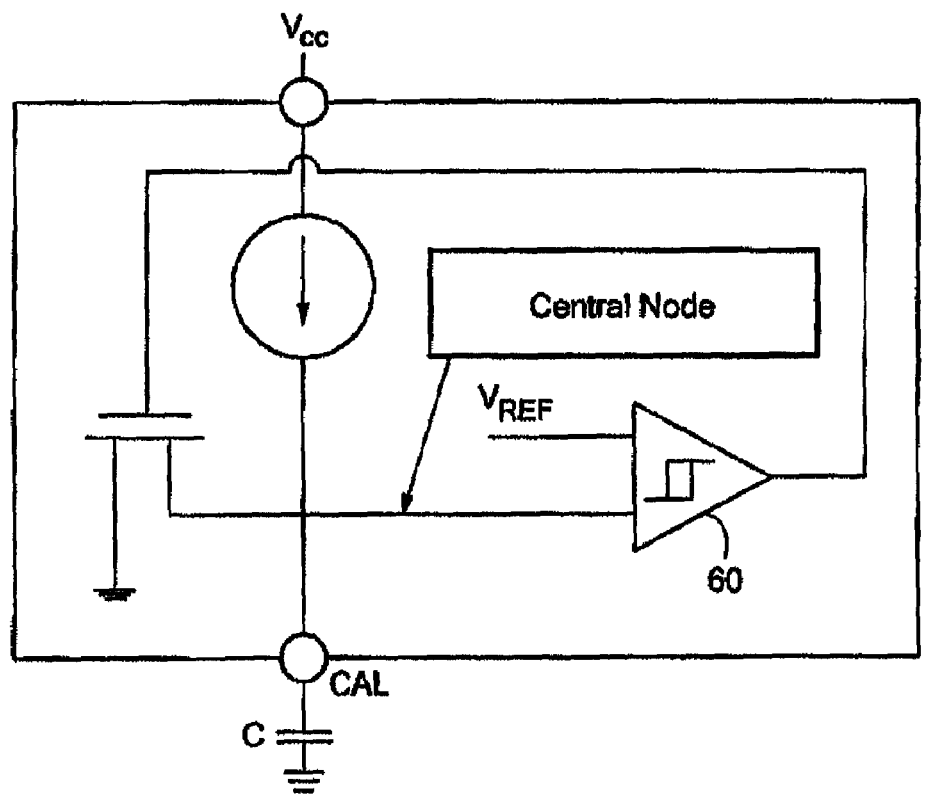
FIG. 37 is a schematic representation of an AGC and/or AOA timing circuit.
Figure 38:
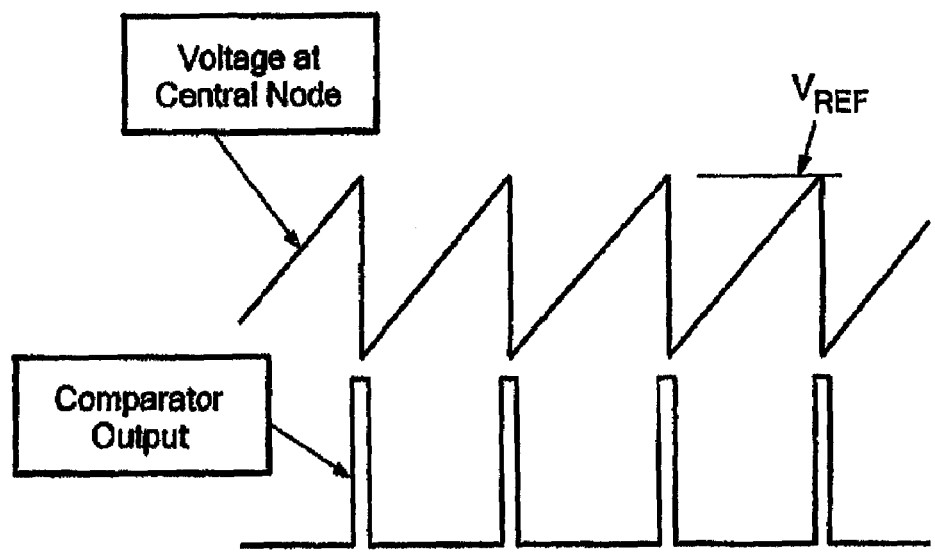
FIG. 38 is a graphical depiction of signals in the circuit of FIG. 37.

FIGS. 37 and 38 show an exemplary technique for controlling the speed of the AGC and AOA during running mode via a timing mechanism. An external capacitor C on a calibrate pin CAL charges the central node. When the voltage on the capacitor C reaches $V_{REF}$, a comparator CO trips and discharges the capacitor. The comparator CO output will pulse high momentarily. AOA and AGC corrections can be updated whenever the comparator pulses high. Choosing different size capacitors can control the speed of the comparator pulses. Tying the CAL pin LOW will shut off the dynamic updating mode.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A sensor, comprising:
   a signal generation module including a first magnetic sensor to generate a first waveform in the form of a sine wave and a second magnetic sensor to generate a second waveform in the form of a cosine wave, the first and second waveforms containing angular position information of a magnet in relation to the first and second magnetic sensors;
   an analog signal processing module for providing an algebraic manipulation of the first waveform and the second waveform to generate a linear position output voltage signal; and
   a signal inversion module coupled to the signal generation module for inverting the first waveform to provide a first inverted waveform and for inverting the second waveform to provide a second inverted waveform, wherein the signal inversion module outputs the first and second waveforms in a first region spanning a first range of angular position of the magnet and outputs the first and second inverted waveforms in a second region spanning a second range of angular position of the magnet,
   wherein an output of the sensor is defined by $$\text{output} = \frac{A\sin(\theta)}{A\cos(\theta) \pm Ab},$$

wherein A is an amplitude of the first and second waveforms, b is a constant and θ indicates an angle of a rotating magnet in the magnetic sensor.

2. The sensor according to claim 1, wherein the second region corresponds to a position range in which output would be non-linear without inversion of the first and second waveforms.

3. The sensor according to claim 2, further including a region indicator bit to indicate position range in the first or second region.

4. The sensor according to claim 1, wherein the first region spans about one hundred and eighty degrees.

5. The sensor according to claim 1, wherein the first region corresponds to −sin(θ) >cos(θ) where −sin(θ) refers to the inversion of the sine wave about an offset voltage, and sin(θ) and cos(θ) embody the amplitudes and offsets associated with the sinusoids.

6. The sensor according to claim 5, wherein the first region corresponds to a range for θ of about 315 degrees to about 135 degrees.

7. The sensor according to claim 1, wherein the signal processing module includes an analog multiplier.

8. The sensor according to claim 1, wherein the sensor is provided on a single substrate.

9. The sensor according to claim 1, wherein the magnetic sensor includes a magnet having a plurality of pole-pairs to increase a frequency of generated waveforms for reducing a maximum angular error.

10. The sensor according to claim 9, wherein the magnet is a ring magnet.

11. The sensor according to claim 1, wherein the magnetic sensor is a Hall effect sensor.

12. The sensor according to claim 1, wherein the magnetic sensor is an AMR sensor.

13. The sensor according to claim 1 wherein the magnetic sensor is a GMR sensor.

14. The sensor according to claim 11, further including a first die for circuitry and a second die for a Hall effect sensor.

15. The sensor according to claim 14, wherein the second die is formed from GaAs.

16. The sensor according to claim 1, further including automatic gain control for the first waveform.

17. The sensor according to claim 1, further including automatic offset adjust of the first waveform.

18. A sensor, comprising:
   a signal generation module including a first magnetic sensor to generate a first waveform in the form of a sine wave and a second magnetic sensor to generate a second waveform in the form of a cosine wave, the first and second waveforms containing angular position information of a magnet in relation to the first and second magnetic sensors;
   an analog signal processing module for providing an algebraic manipulation of the first waveform and the second waveform to generate a linear position output voltage signal; and
   a signal inversion module coupled to the signal generation module for inverting the first waveform to provide a first inverted waveform and for inverting the second waveform to provide a second inverted waveform, wherein the signal inversion module outputs the first and second waveforms in a first region spanning a first range of angular position of the magnet and outputs the first and second inverted waveforms in a second region spanning a second range of angular position of the magnet,
   wherein the first region corresponds to sin(θ) > cos(θ) where sin(θ) refers to the inversion of the sine wave about an offset voltage, sin(θ) and cos(θ) embody the amplitudes and offsets associated with the sinusoids, and θ indicates an angle of a rotating magnet in the magnetic sensor.

19. The sensor according to claim 18 wherein the magnetic sensor is a Hall sensor.

20. The sensor according to claim 18 further including automatic gain control for the first waveform.

21. The sensor according to claim 18 further including automatic offset adjust of the first waveform.

22. The sensor according to claim 18 wherein the first region corresponds to a range for θ of about 315 degrees to about 135 degrees 23. A sensor, comprising:
   a signal generation module including a first magnetic sensor to generate a first waveform in the form of a sine wave and a second magnetic sensor to generate a second waveform in the form of a cosine wave, the first and second waveforms containing angular position information of a magnet in relation to the first and second magnetic sensors;
   an analog signal processing module for providing an algebraic manipulation of the first waveform and the second waveform to generate a linear position output voltage signal; and
   a signal inversion module coupled to the signal generation module for inverting the first waveform to provide a first inverted waveform and for inverting the second waveform to provide a second inverted waveform, wherein the signal inversion module outputs the first and second waveforms in a first region spanning a first range of angular position of the magnet and outputs the first and second inverted waveforms in a second region spanning a second range of angular position of the magnet,
   wherein output in the first region is defined by $$\text{output} = \frac{A\sin(\theta) + \text{offset}}{\frac{1}{k}(A\sin(\theta) + A\cos(\theta) + 2\text{offset})}$$

where θ indicates an angle of the magnet in relation to the first and second magnetic sensors, offset is a vertical offset of the first and second waveforms with respect to ground, A is an amplitude of the first and second waveforms, and k is a real number affecting gain and vertical offset of the output.

24. The sensor according to claim 23 wherein the magnetic sensor is a Hall sensor.

25. The sensor according to claim 23 further including automatic gain control for the first waveform.

26. The sensor according to claim 23 further including automatic offset adjust of the first waveform.

* * * * *

UNITED STATES PATENT AND TRADEMARK OFFICE
CERTIFICATE OF CORRECTION

| | | |
|---|---|---|
| PATENT NO. | : 7,714,570 B2 | Page 1 of 1 |
| APPLICATION NO. | : 11/425567 | |
| DATED | : May 11, 2010 | |
| INVENTOR(S) | : Thomas et al. | |

It is certified that error appears in the above-identified patent and that said Letters Patent is hereby corrected as shown below:

Column 2, line 44 delete "in second" and replace with --in a second--.

Column 6, line 11 delete "anisotrpic" and replace with --anisotropic--.

Column 7, line 2 delete "associated ground" and replace with --associated with ground--.

Column 8, line 29 delete "k sin" and replace with --ksin--.

Column 9, line 28 delete "in the in the" and replace with --in the--.

Column 10, line 53 delete "act" and replace with --acts--.

Column 17, line 34 delete "Ga sin (Γ+β)" and replace with --Gasin (θ + β)--.

Column 19, line 38-41 delete ". As shown in FIG. 34, the "cane" waveform can be divided by the rectified G|A cos(q)| the output of which can be trimmed in output gain and offset accordingly." and replace with --As shown in FIG. 34, the rectified G|Acos(θ)| can be divided by the "cane" waveform the output of which can be trimmed in output gain and offset accordingly.--.

Column 22, line 29 delete "sin(θ)" and replace with -- –sin(θ)--.

Column 22, line 30 delete "sin(θ) and replace with -- –sin(θ)--.

Signed and Sealed this
Eighth Day of February, 2011

David J. Kappos
*Director of the United States Patent and Trademark Office*